(12) United States Patent
Miller et al.

(10) Patent No.: US 9,976,076 B2
(45) Date of Patent: May 22, 2018

(54) PHOTOCHROMIC ARTICLES CONTAINING A POLYOXOMETALATE AND METHODS OF MAKING SAME

(71) Applicant: 3M INNOVATIVE PROPERTIES COMPANY, St. Paul, MN (US)

(72) Inventors: Adam D. Miller, St. Paul, MN (US); Matthew H. Frey, Cottage Grove, MN (US); Daniel E. Isaacson, Maplewood, MN (US); Jonathan E. Janoski, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days. days.

(21) Appl. No.: 15/320,516

(22) PCT Filed: Jun. 22, 2015

(86) PCT No.: PCT/US2015/036919
§ 371 (c)(1),
(2) Date: Dec. 20, 2016

(87) PCT Pub. No.: WO2016/003685
PCT Pub. Date: Jan. 7, 2016

(65) Prior Publication Data
US 2017/0190963 A1 Jul. 6, 2017

Related U.S. Application Data

(60) Provisional application No. 62/018,877, filed on Jun. 30, 2014.

(51) Int. Cl.
*C09K 9/00* (2006.01)
*C09K 9/02* (2006.01)
(Continued)

(52) U.S. Cl.
CPC .................................... *C09K 9/00* (2013.01)

(58) Field of Classification Search
CPC ...... C09K 9/00; C09K 9/02; C09K 2211/183; C09D 5/29; C09D 11/50; C08L 33/12;
(Continued)

(56) References Cited

U.S. PATENT DOCUMENTS 2,895,892 A  7/1959 Chalkley
5,240,860 A  8/1993 Hoenes
(Continued)

FOREIGN PATENT DOCUMENTS

EP  0659807  6/1995
EP  0723970  7/1996
WO  WO 2016-003683  1/2016

OTHER PUBLICATIONS

Haolong Li, Wei Qi, Hang Sun, Pan Li, Yang Yang, Lixin Wu, A novel polymerizable pigment based on surfactant-encapsulated polyoxometalates and their application in polymer coloration, Dyes and Pigments 79 (2008) 105-110.*

(Continued)

*Primary Examiner* — Bijan Ahvazi
(74) *Attorney, Agent, or Firm* — Adrian L. Pishko

(57) ABSTRACT

A photochromic article is provided, containing a polymer and a polyoxometalate and counter cation complex distributed in the polymer. A method of forming a photochromic film is also provided, including forming a composition containing a polymer or a precursor of the polymer and a polyoxometalate and counter cation complex and preparing a film from the composition, the film containing the polyoxometalate and counter cation complex distributed in the polymer. Further, a precursor composition is provided, including a polymer or a precursor of the polymer and a polyoxometalate anion and a counter cation.

15 Claims, 4 Drawing Sheets

(51) Int. Cl.
   *C09D 5/29* (2006.01)
   *C09D 11/50* (2014.01)
   *C08L 33/12* (2006.01)
   *C08J 5/18* (2006.01)

(58) Field of Classification Search
   CPC ..... C08L 2203/16; C08J 5/18; C08J 2333/12; C08J 2485/00
   See application file for complete search history.

(56) References Cited

U.S. PATENT DOCUMENTS

| | | | |
|---|---|---|---|
| 5,286,885 | A | 2/1994 | Goetz |
| 5,391,638 | A | 2/1995 | Katsoulis |
| 5,471,337 | A | 11/1995 | Babinec |
| 8,206,874 | B2 | 6/2012 | Hamrock |
| 2003/0027052 | A1 | 2/2003 | Huang |
| 2008/0257204 | A1 | 10/2008 | Oriakhi |
| 2008/0299433 | A1 | 12/2008 | Stanis |

OTHER PUBLICATIONS

Z.J. Ku, S.R. Jin, and H.B. Zhou, Synthesis and Characterization of Two Charge-Transfer Salts Based on Keggin-Type Polyoxometalates and Morpholinebiguanide, Russian Journal of Coordination Chemistry, 2009, vol. 35, No. 3, pp. 195-199. © Pleiades Publishing, Ltd., 2009.*

Bi Lihua, He Qizhuang, Jia Qiong, Wang Enbo, Synthesis, properties and crytsal structure of (Gly)2H4SiW12O40.5.5H2O, Journal of Molecular Structure, 597 (2001) 83-91.*

Akoi, "Polyoxometalate (POM)-based, multi-functional, inorganic-organic, hybrid compounds: syntheses and molecular structures of silanol- and/or siloxane bond-containing species grafted on mono- and tri-lacunary Keggin POMs", Dalton Transactions, 2011, vol. 40, pp. 1243-1253.

Bao, "A Novel Structure and Photochromism of heteropolyoxometalates dispersed in polymer networks", Journal of Solid State Chemistry, Jul. 2012, vol. 191, pp. 158-161. XP028430365.

Bi, "Synthesis, properties and crystal structure of some polyoxometallates containing the tris (hydroxymethyl) aminomethane cation", Inorg. Chim. Acta., 2000, vol. 305, pp. 163-171.

Chen, "Preparation and photochromism of nanocomposite thin film based on polyoxometalate and polyethyleneglycol", Dec. 2007, vol. 61, No. 30, pp. 5247-5249. XP022315194.

Feng, "Novel hybrid inorganic-organic film based on the tungstophosphate acid-polyacrylamide system: Photochromic behavior and mechanism", J. Mater. Res., Jan. 2002, vol. 17, No. 1, pp. 133-136.

Ginsberg, "α-, β-, and γ-Dodecatungstosilicic Acids: Isomers and Related Lacunary Compounds", Inorganic Syntheses, 1990, vol. 27, pp. 85-96.

Gouzerh, "Main-group Element, organic, and organometallic Derivatives of polyoxometalates", Chemical Reviews, 1998, vol. 98, No. 1, pp. 77-111. XP055216308.

Judeinstein, "Synthesis and Multispectroscopic Characterization of Organically Modified Polyoxometalates", J. Chem. Soc. Dalton Trans., Jan. 1, 1991, pp. 1991-1997. XP002027205.

Judeinstein, "Synthesis and Properties of Polyoxometalates Based Inorganic-Organic Polymers" Chem. Mater. 1992, vol. 4, No. 1, pp. 4-7.

Knoth, "Derivatives of heteropolyanions. 1. Organic derivatives of W12SiO404-, W12PO403-, and MO12SiO404", Journal of the American Chemical Society, Jan. 31, 1979, vol. 101, No. 3, pp. 759-760.

Li, "A novel polymerizable pigment based on surfactant-encapsulated polyoxometalates and their application in polymer coloration", Dyes and Pigments, Nov. 1, 2008, vol. 79, No. 2, pp. 105-110. XP022640120.

Oliveira Jr., "Local Structure and Photochromic Response in Ormosils Containing Dodecatungstophosphoric Acid", Chemistry of Materials, 2011, vol. 23, No. 4, pp. 953-963.

Qi, "Polyoxometalate/polymer hybrid materials; fabrication and properties", Polymer International, 2009, vol. 58, No. 11, pp. 1217-1225. XP055214326.

Yang, "A novel photochromic PVA fiber aggregates contained H4SiW12O40", Mater. Lett. 2005, vol. 59, pp. 450-455.

Zhang, "Construction of Self-Assembled Ultrathin Polyoxmetalate/ 1, 10-Decanediamine Photochromic Films", J. Phys. Chem. B, 2004, vol. 108, pp. 6944-6948.

Zhong, "Polyoxometalate cured epoxy resins with photochromic properties", Colloid and Polymer Science, Nov. 2012, vol. 290, No. 16, pp. 1683-1693. XP035125300.

International Search Report for PCT International Application No. PCT/US2015/036919 dated Sep. 9, 2015, 4 pages.

* cited by examiner

PHOTOCHROMIC ARTICLES CONTAINING A POLYOXOMETALATE AND METHODS OF MAKING SAME

CROSS REFERENCE TO RELATED APPLICATIONS

This application is a national stage filing under 35 U.S.C. 371 of PCT/US2015/036919, filed Jun. 22, 2015, which claims the benefit of U.S. Application No. 62/018,877, filed Jun. 30, 2014, the disclosure of which is incorporated by reference in its/their entirety herein.

TECHNICAL FIELD

The present disclosure relates to articles including a photochromic polyoxometalate and counter cation complex, such as films, coatings, glazings, adhesives, inks, optical elements (e.g., ophthalmic lenses) or pellets, precursor compositions, including fluid precursor compositions, for making the articles, such as liquid solutions, fluid dispersions, or powders, and methods of making the articles.

BACKGROUND

There is a need in the art for improved photochromic articles such as coatings, films, and optical elements. Most successful commercial applications of photochromic articles are related to ophthalmic lenses that darken in the sun and return to their initial transparency in typical indoor light. Some niche markets include the security ink and the entertainment/toy markets. There are technical challenges that prevent this technology from entering the vehicles, windows, and structural glass markets, including durability, fatigue, and switching time. The organic dyes that have been used in a majority of the photochromic systems are degraded by light and oxygen and thus their lifetimes suffer. Typical known materials do not compare well with the traits desired, for instance, in a photochromic system designed for window applications.

SUMMARY

The present disclosure provides articles and methods for making articles containing a photochromic polyoxometalate and counter cation complex.

In a first embodiment, the present disclosure provides a photochromic article including a polymer and a polyoxometalate and counter cation complex comprising a polyoxometalate anion and a counter cation. The polyoxometalate anion is of formula (I):

$$(X_xM_mM'_nO_y)^{q-} \quad (I)$$

wherein:
X is a heteroatom selected from Cu, Zn, Co, Fe, B, Ga, Rh, Al, Cr, Mn, Ni, Ti, Zr, Si, Ge, P, As, Te, or I;
x is from 0 to 30;
m is from 3 to 248;
n is from 0 to m/2, with the proviso that (0≤x<m+n);
y is from 10 to 720;
q is from 1 to 20;
M and M' are early transition metals independently selected from V, Nb, Ta, Mo or W; and
O is oxygen; and
the counter cation is one or more of formula (II), of formula (III), of formula (IV), a phenylalanine cation, an alanine cation, an arginine cation, a glycine cation, a histidine cation, a proline cation, an aniline cation, a N,N-dimethylaminopyridine cation, a morpholine cation, or a piperazine cation;

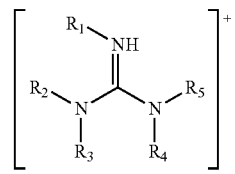

wherein:
$R_1$ through $R_5$ are independently selected from H, an alkyl group, an alicyclic group, an alkenyl group, and an aryl group, with the proviso that fewer than all of $R_1$ through $R_5$ are H; or $R_1$ through $R_3$ are independently selected from H, an alkyl group, an alicyclic group, an alkenyl group, and an aryl group, and $R_4$ and $R_5$ taken together with the N to which they are both bonded form a heterocyclic ring;

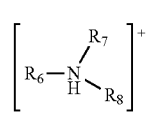

wherein:
$R_6$ is H, an alkyl group, an alkylamine group, or an alicyclic group; $R_7$ is an alkyl group or an alkylamine group; $R_8$ is H or an alkyl group; and

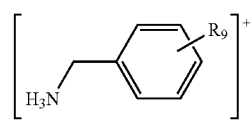

wherein $R_9$ is C≡N, an alkoxy group, an alkyl group, an alkenyl group, or an aryl group; and
the polyoxometalate and counter cation complex optionally includes at least one monatomic counter cation;
wherein the article is photochromic. The polyoxometalate and counter cation complex is distributed in the polymer. Preferably, the polymer does not participate stoichiometrically in a photochromic redox reaction of the polyoxometalate anion and counter cation complex.

In a second embodiment, the present disclosure provides a method of forming a photochromic film including forming a composition containing a polymer or a precursor of the polymer and a polyoxometalate and counter cation complex distributed in the polymer or precursor of the polymer and preparing a film from the composition. The film includes the polyoxometalate anion and counter cation complex according to the first embodiment distributed in the polymer or precursor of the polymer. The film is photochromic. Preferably, the polymer does not participate stoichiometrically in a photochromic redox reaction of the polyoxometalate anion and counter cation complex.

In a third embodiment, the present disclosure provides precursor compositions for the formation of articles comprising a polymer and a polyoxometalate and counter cation complex comprising a polyoxometalate anion and a counter cation. In certain aspects of the above third embodiment, the precursor composition further comprises a solvent, for instance a solvent comprising water or an organic solvent, and the polymer or precursor of the polymer is dissolved in the solvent. Suitable organic solvents include for example and without limitation, acetonitrile and/or methylethyl ketone. The POM and counter cation complex (i.e., the polyoxometalate and counter cation complex) may be dissolved in the composition or may be dispersed in the composition. In some embodiments, the polyoxometalate and counter cation complex is dissolved or dispersed in a monomer. The polyoxometalate and counter cation complex comprises a polyoxometalate anion and a counter cation. In the precursor compositions of the third embodiment, the polyoxometalate anion and the counter cation may be dissociated. The precursor compositions include the polyoxometalate anion and counter cation complex according to the first embodiment.

Various unexpected results and advantages are obtained in exemplary embodiments of the disclosure. One such advantage of exemplary embodiments of the present disclosure is that the relative inertness of the polymer during photochromic cycling decreases the degradation of the polymer during the use of the article.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

The disclosure may be more completely understood in consideration of the following detailed description of various embodiments of the disclosure in connection with the accompanying figures, in which.

Figure 1:
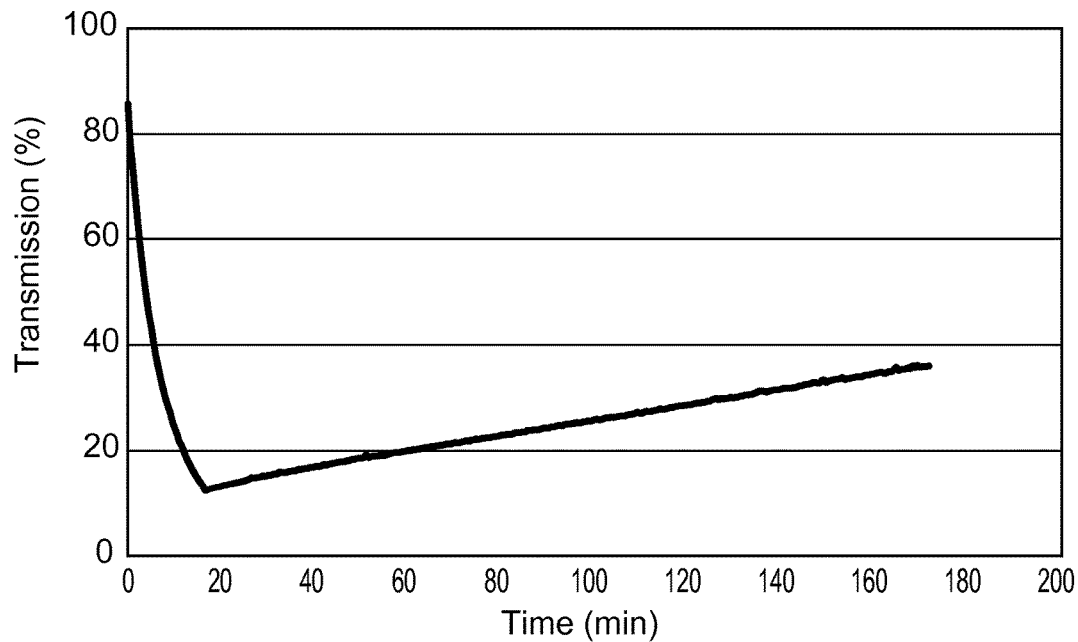
FIG. 1 is a graph of transmittance versus time of a poly(THF acrylate) film containing 30 wt % $(C_2H_8N_3)_3$ $[PW_{12}O_{40}]$ during irradiation with light from a solar simulator and subsequent removal of the light.

While the above-identified figures, which may not be drawn to scale, relate to certain embodiments of the present disclosure, other embodiments are also contemplated, as noted in the detailed description.

DETAILED DESCRIPTION

As noted above, technical challenges prevent photochromic technology from entering various commercial markets, including challenges such as durability, fatigue, and switching time. The organic dyes that have been used in a majority of the photochromic systems are degraded by light and oxygen and thus their lifetimes suffer. The present disclosure provides articles and methods for making articles containing a photochromic polyoxometalate and counter cation complex.

Inorganic-organic hybrid materials based on polyoxometalate inorganic anions with organic functionalities which have been combined electrostatically (organic cation-inorganic anion interactions, an example of a polyoxometalate and counter cation complex) are provided to give materials that exhibit reversible photochromism in the solid state. It has been discovered that some, but not all, polyoxometalate and counter cation complexes exhibit photochromism. Furthermore, it has been discovered that some polyoxometalate and counter cation complexes are suitable for distribution in polymers, for example distribution in inert polymers or polymers that do not participate in a photochromic redox reaction of the polyoxometalate and counter cation complex, to give photochromic articles of high optical quality and photochromic performance, for example photochromic films, coatings, adhesives, optical elements, and inks. For instance, the polyoxometalate ion may include heteropolyoxometalates of tungsten or molybdenum, in which the hetero atom is Si, P, B, etc. The heteropolyoxometalate and counter cation complex preferably has at least one organoammonium counter cation to enhance the reversibility of the photochromic response of the material. Such materials can then be incorporated into a polymer matrix and used as optical films. Optical films may be used in, but are not limited to, applications including window films, lenses, displays, indicators, architectural glazings, automotive glazings, sensors, optical memory devices, and security features on documents. Such materials can then be incorporated into a polymer matrix and used as adhesives, optical elements (e.g., ophthalmic lenses), coatings, inks, and glazings.

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. It should be understood that, as used herein:

As used in this specification and the appended embodiments, the singular forms "a", "an", and "the" include plural referents unless the content clearly dictates otherwise. Thus, for example, reference to "a compound" includes a mixture of two or more compounds. As used in this specification and the appended embodiments, the term "or" is generally employed in its sense including "and/or" unless the content clearly dictates otherwise.

As used in this specification, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

The terms "comprises" and variations thereof do not have a limiting meaning where these terms appear in the description and claims.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

The term "polyoxometalate anion" (abbreviated POM anion) refers to a discrete oxygen cluster anion generally of early transition metals, which may also include one or more of a variety of heteroatoms and that has a defined molecular structure and lacks polydispersity. Polyoxometalate anions form a structurally distinct class of complexes based predominately, although not exclusively, upon quasi-octahedrally-coordinated metal atoms. The $MO_6$ units are joined together through shared edges and/or vertices, or, less commonly, faces. Heteroatoms may be present in polyoxometalates. Different elements can act as heteroatoms, with various coordination numbers: 4-coordinate (tetrahedral) in Keggin and Wells-Dawson structures (e.g., $PO_4$, $SiO_4$); 6-coordinate (octahedral) in Anderson structure (e.g. $Al(OH)_6$, $TeO_6$); and 8-coordinate (square antiprism) e.g. $((CeO_8)W_{10}O_{28})^{8-}$.

A "lacunary polyoxometalate" refers to any poloxometalate cluster anion which is deficient in one or more addenda metals creating at least one vacant site on the cluster. The at least one vacant site allows for chemical modification of the POM, for instance, covalent tethering of organic groups through a siloxane linker. The chemical modification of a POM anion using covalent tethering of an organic group through a siloxane linker is an example of organic modification of a POM. Such clusters are termed "derivatives of POMs", "POM derivatives", or "polyoxometalate derivatives" herein. In most, but not all, cases the free lacunary polyanion is also independently stable and isolable.

Thus, the term "polyoxometalate anion" is applied to a group of discrete anionic clusters with frameworks built from transition metal polyhedra linked by shared oxo ligands. The term is generally applied to clusters of 3 or more transition metal atoms from group 5 and group 6 in their high oxidation states, (d0 and d1 configuration), e.g. V(V), Nb(V), Ta(V), Mo(VI) and W(VI).

A salt from a POM anion and a counter cation (that is not a proton) is called a "POM salt complex". POM salt complexes dissociate into their respective POM anions and counter cations when dissolved in a solvent, like a typical salt (e.g. NaCl in water).

A "dissolved polyoxometalate anion" (abbreviated dissolved POM anion) refers to a polyoxometalate in its discrete molecular state, dissolved in (i.e., solvated by), for example, a polymer and/or a solvent.

A "polyoxometalate and counter cation complex" refers to a polyoxometalate anion associated with one or more cations (herein referred to as counter cations) through ionic bonding. Thusly, a polyoxometalate and counter cation complex comprises at least one polyoxometalate anion and at least one counter cation. The counter cations of the present disclosure are not polymeric. For example, when a polyoxometalate and counter cation complex is distributed in a polymer, according to the present disclosure, the counter cations are not a constituent of the polymer (i.e., the counter cations are not covalently bonded to the polymer). When distributed in a polymer (e.g., as part of an article), a polymer precursor composition, liquid solution, fluid dispersion, or powder, the proportion (or stated differently as concentration or amount) of polyoxometalate and counter cation complex is given by the weight percent (also abbreviated as wt % herein) of the following components relative to the overall weight of the article, polymer precursor composition, liquid solution, fluid dispersion, or powder: polyoxometalates plus all associated counter cations plus all associated waters of hydration (when the polyoxometalate and counter cation complex is in the solid state). Polyoxometalate and counter cation complexes are also referred to herein as POM and counter cation complexes.

A "polyoxometalate and counter cation complex particle" (abbreviated POM and counter cation complex particle) refers to polyoxometalate anions in an aggregated state (i.e., not dissolved, but rather for instance dispersed) along with counter cations (like those described in the text below) and optionally any waters of hydration. A polyoxometalate and counter cation complex particle may be amorphous or crystalline. POM and counter cation complex particles can include POM salt complex particles, for example POM salt complex crystals.

Herein, a polyoxometalate and counter cation complex (abbreviated POM and counter cation complex) may be either aggregated (i.e. POM and counter cation complex particle) and molecular states (i.e. dissolved POM anion and counter cation, associated).

The term "photochromic article" refers to an article which reversibly changes its absorption properties (i.e. color) caused by a photochemical reaction within the material upon exposure to specific wavelengths of electromagnetic radiation. In the present text, the term shall be applied to articles which exhibit a reversible change in transmission or reflection of 5% or more.

The phrase "the polymer does not participate in a photochromic reaction of the polyoxometalate and counter cation complex" means that there is no reaction mechanism that can be described as a stoichiometric reaction between the polyoxometalate anion and the polymer matrix and that accounts for the majority of the observed absorbance change in a photochromic article upon exposure to electromagnetic radiation.

The term "(co)polymer" refers to polymers containing two or more different monomers.

The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkylene group" refers to a divalent alkyl group. The term "alkenyl group" means a saturated hydrocarbon group bonded to an unsaturated hydrocarbon group.

The term "aliphatic group" means a saturated or unsaturated linear or branched hydrocarbon group. This term is used to encompass alkyl, alkenyl, and alkynyl groups, for example.

The term "heteroalkyl group" means an alkyl group having at least one —$CH_2$— replaced with a heteroatom such as O or S.

The term "alicyclic group" means a cyclic hydrocarbon group having properties resembling those of aliphatic groups. The term "heterocyclic group" means a cyclic aliphatic group having at least one —$CH_2$— replaced with a heteroatom such as O or S.

The term "amine group" means an organic group containing a nitrogen atom.

The term "alkylamine group" means a saturated linear or branched hydrocarbon group bonded to an amine group.

The term "aromatic group" or "aryl group" means a mono- or polynuclear aromatic hydrocarbon group.

The term "imine group" means a group in which a divalent nitrogen atom is bound to one hydrogen atom and to two alkyl or aryl groups.

The term "(meth)acrylic" or "(meth)acrylate" is inclusive of both acrylic and methacrylic (or acrylate and methacrylate).

When a group is present more than once in a formula described herein, each group is "independently" selected, whether specifically stated or not. For example, when more than one R group is present in a formula, each R group is independently selected.

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment," "in many embodiments" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

Various exemplary embodiments of the disclosure will now be described. Exemplary embodiments of the present disclosure may take on various modifications and alterations without departing from the spirit and scope of the disclosure. Accordingly, it is to be understood that the embodiments of the present disclosure are not to be limited to the following described exemplary embodiments, but are to be controlled by the limitations set forth in the claims and any equivalents thereof.

In a first embodiment, the present disclosure provides a photochromic article including a polymer and a polyoxometalate and counter cation complex comprising a polyoxometalate anion and a counter cation. The polyoxometalate anion is of formula (I):

$$(X_xM_mM'_nO_y)^{q-} \quad (I)$$

wherein:
X is a heteroatom selected from Cu, Zn, Co, Fe, B, Ga, Rh, Al, Cr, Mn, Ni, Ti, Zr, Si, Ge, P, As, Te, or I;
x is from 0 to 30;
m is from 3 to 248;
n is from 0 to m/2, with the proviso that (0≤x<m+n);
y is from 10 to 720;
q is from 1 to 20;
M and M' are early transition metals independently selected from V, Nb, Ta, Mo or W; and
O is oxygen; and
the counter cation is one or more of formula (II), of formula (III), of formula (IV), a phenylalanine cation, an alanine cation, an arginine cation, a glycine cation, a histidine cation, a proline cation, an aniline cation, a N,N-dimethylaminopyridine cation, a morpholine cation, or a piperazine cation;

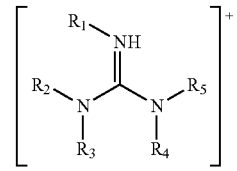

(II)

wherein:
$R_1$ through $R_5$ are independently selected from H, an alkyl group, an alicyclic group, an alkenyl group, and an aryl group, with the proviso that fewer than all of $R_1$ through $R_5$ are H; or $R_1$ through $R_3$ are independently selected from H, an alkyl group, an alicyclic group, an alkenyl group, and an aryl group, and $R_4$ and $R_5$ are combined together with the N to which they are both bonded forming a heterocyclic ring;

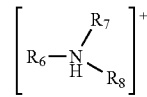

(III)

wherein:
$R_6$ is H, an alkyl group, an alkylamine group, or an alicyclic group; $R_7$ is an alkyl group or an alkylamine group; $R_8$ is H or an alkyl group; and

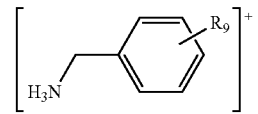

(IV)

wherein $R_9$ is C≡N, an alkoxy group, an alkyl group, an alkenyl group, or an aryl group; and
the polyoxometalate and counter cation complex optionally includes at least one monatomic counter cation;

wherein the polyoxometalate and counter cation complex is distributed in the polymer. The article is photochromic.

The polyoxometalate anion often comprises a Keggin structure. A Keggin structure has a general formula of $[XM_{12}O_{40}]^{n-}$, where X is the heteroatom and M is the addenda atom. The Keggin structure is often the most facile structure of polyoxometalate complexes to isolate. In alternate aspects, the polyoxometalate and counter cation complex comprises a Wells-Dawson structure. A Wells-Dawson structure is made up of two Keggin lacunary fragments with three missing octahedra.

In certain embodiments, the one or more early transition metal includes M or M' as being W or Mo. The number of early transition metal atoms, m, is from 3 to 248, such as from 3 to 18. When a heteroatom, X, is present in the polyoxometalate, it is typically silicon (Si), boron (B), phosphorous (P), or germanium (Ge). The number of oxygen (O) atoms, y, is from 10 to 720, such as from 10 to 62. The negative charge, q, of the polyoxometalate anion is from 1 to 20, such as from 2 to 10. Typically, the number of charges given by counter cations, matches the charge of the POM anion, q, to provide an uncharged complex. In aspects where at least one monatomic counter cation is included, however, the number of charges given by counter cations will concomitantly be decreased. In certain embodiments, the charges of the POM anion and the counter cation will not add up to zero and the complex will be charged. The number of counter cations can vary, typically from 1 to 20, or from 2 to 10, and may be represented by j, for example:

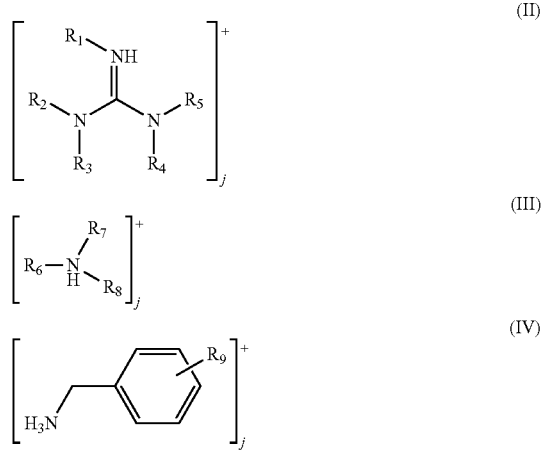

Some exemplary polyoxometalate and counter cation complexes include for example and without limitation, $(CH_3NHCNH_2NH_2)_3[PW_{12}O_{40}]$, $(CH_3CH_2NHCNH_2NH_2)_3[PW_{12}O_{40}]$, $((CH_3)_2NCNH_2NH_2)_3[PW_{12}O_{40}]$, $(CH_3NHCNH_2NH_2)_5[BW_{12}O_{40}]$, $(CH_3NHCNH_2NH_2)_4[SiW_{12}O_{40}]$, or a combination thereof.

The polymer in the present disclosure advantageously does not participate stoichiometrically in a photochromic redox reaction of the POM and counter cation complex (i.e., the polyoxometalate and counter cation complex). Contrasting compositions in the art include polyoxometalates distributed in polymers wherein the polymer does participate in the photochromic redox reaction of the polyoxometalates. For example, contrasting compositions in the art include polymers such as polyethyleneimine (also referred to as PEI) or polyvinylalcohol (also referred to as PVA), which are known to react photochemically with polyoxometalates to reduce the POM and induce a color change (photochromism). Participation, particularly stoichiometrically, by the polymer matrix of a material in a photochromic redox reaction with a polyoxometalate distributed therein creates a potential pathway for photolytic degradation of the polymer, and loss of physical or chemical integrity for the overall material, or other potentially important properties (e.g., optical transparency). The approach taken with the compositions of the present disclosure (of distributing the polyoxometalate and counter cation complex within a separate polymer that does not participate in the photochromic redox reaction) includes decoupling the photochromic redox reaction from such other demands on a polymer (e.g., photochemical durability) having polyoxometalates distributed therein. The polymer of the present disclosure preferably comprises polymethylmethacrylate (PMMA), poly(butyl acrylate), poly(tetrahydrofurfural acrylate), poly(iso-octyl acrylate), poly(isobornyl acrylate), poly(hydroxyethyl acrylate), polymethylmethacrylate copolymer, or a combination thereof. In certain aspects, the polymer comprises PMMA or a combination of PMMA with 1,6-hexanediol diacrylate. The inclusion of organic groups in the counter cation may further enhance the stability of POM in the polymer. The polymers identified above can advantageously form articles, for instance films, which retain their structural integrity when containing POM particles distributed therein. In certain embodiments, the POM particles are contained in only a portion of the article.

To maximize even photochromic properties throughout the article, the POM and counter cation complex (i.e., polyoxometalate and counter cation complex) is preferably homogeneously distributed in the polymer. Typically, the article is in the form of a film. The article is optionally in the form of a plurality of pellets, which may then be incorporated into any number of different articles. In some embodiments, the article is in the form of a coating on a substrate. In some embodiments the article is in the form of an adhesive composition, for example a pressure sensitive adhesive, also referred to herein as a PSA (e.g., and acrylic PSA or silicone PSA). In some embodiments, the article is in the form of an optical element, for example an ophthalmic lens.

The proportion (or stated differently as concentration or amount) of polyoxometalate complex provided in the articles is not particularly limited, although certain amounts are preferred. The articles include at least 5% by weight of the POM and counter cation complex, at least 10% by weight, at least 15% by weight, at least 20% by weight, or even at least 25% by weight of the POM and counter cation complex. The articles include up to 30% by weight of the POM and counteraction complex, up to 40% by weight, up to 50% by weight, up to 60% by weight, up to 70% by weight, or even up to 80% by weight of the POM and counter cation complex. For instance, an article comprises 5% by weight to 80% by weight of the POM and counter cation complex, or 10% by weight to 50% by weight of the POM complex, or even 15% by weight to 30% by weight of the POM and counter cation complex. If the amount of POM and counter cation complex in the article is too low, the article will not exhibit sufficient photochromism. If the amount of POM and counter cation complex in the article is too high, the POM and counter cation complex may interfere with the integrity of the polymer in maintaining the structure of the article.

POM and counter cation complex particles can be obtained from dissolved POM clusters by drying (e.g. evaporation, spray drying, lyophilization) of a POM anion and counter cation containing solution, followed by grinding or dispersing the solid residue, or by precipitation or crystallization from a POM anion and counter cation containing solution and collection of the resulting solid by filtration. The selection of the counter cation can determine the ultimate solubility of a POM and counter cation complex in a given polymer as well as determine the photochromic activity of the POM and counter cation complex. The articles disclosed herein may not only comprise one type of POM and counter cation complex, but rather at least one, two, three, four, five, or six or more POM and counter cation complexes of different chemical formulae. POM and counter cation complexes can be produced according to processes described in the prior art and known to the skilled person. Examples of how to produce POM and counter cation complexes are given in the Example section below.

In certain embodiments, a suitable molecular size of a POM anion is from about 0.5 to about 5 nm; with a molecular weight: from about 800 to about 10,000 g/mol. A molecular size within this range can be beneficial in particular to provide a highly translucent material. Suitable particle size ranges for POM and counter cation complex particles is from about 5 nm to about 50 µm, from about 7.5 nm to about 25 µm, or from about 10 nm to 10 µm. Typically, the density of the POM and counter cation complex particles ranges from about 1 g/cm$^3$ to about 5 g/cm$^3$ or from about 1.5 g/cm$^3$ to about 2.5 g/cm$^3$. The shape of the POM and counter cation complex particles is not particularly limited, and can be for instance, cylindrical, platelet, spherical, prolate ellipsoid, oblate ellipsoid, needle-like, polyhedral or irregular.

In a second embodiment, the present disclosure provides a method of forming a photochromic film including forming a composition containing a polymer or a precursor of the polymer and a polyoxometalate and counter cation complex distributed in the polymer and preparing a film from the composition. The film includes the polyoxometalate and counter cation complex distributed in the polymer. The film is photochromic. The polymer typically does not participate stoichiometrically in a photochromic redox reaction of the polyoxometalate and counter cation complex.

In certain aspects of the above second embodiment, the composition further comprises a solvent, for instance a solvent comprising water or an organic solvent, and the polymer or precursor of the polymer is dissolved in the solvent. Suitable organic solvents include for example and without limitation, acetonitrile and/or methylethyl ketone. The POM and counter cation complex (i.e., the polyoxometalate and counter cation complex) may be dissolved in the composition or may be dispersed in the composition. In aspects including a solvent in the composition, the method of forming a photochromic film typically further comprises removing at least some of the solvent from the composition, particularly in aspects wherein the preparing the film comprises extruding the composition (e.g., solvent is removed before the film is extruded). As an alternative to extrusion, the preparing of the photochromic film may comprise casting the composition and drying (removing solvent from) the cast composition. Preferably, preparing the film comprises drying the composition in an atmosphere comprising less than 50% relative humidity, or less than 40%, or less than 30%, or less than 20%, or even less than 10% relative humidity. When the composition contains a precursor of a polymer, the preparing of the photochromic film further comprises curing the precursor of the polymer by polymerization (e.g., by thermal polymerization or photopolymerization). In some embodiments, preparing the photochromic film includes curing the polymer by crosslinking (e.g., by electron beam irradiation, UV irradiation, or heating). Other suitable known methods of forming a film will be apparent to the skilled practitioner.

In a third embodiment, the present disclosure provides a precursor composition for forming a photochromic article, the precursor composition comprising a polymer or a precursor of the polymer and a polyoxometalate and counter cation complex comprising a polyoxometalate anion and a counter cation, wherein the precursor composition is a fluid. Typically, the polymer does not participate stoichiometrically in a photochromic redox reaction of the polyoxometalate and counter cation complex. In certain aspects of the above third embodiment, the precursor composition further comprises a solvent, for instance a solvent comprising water or an organic solvent, and the polymer or precursor of the polymer is dissolved in the solvent. Suitable organic solvents include for example and without limitation, acetonitrile and/or methylethyl ketone. The POM and counter cation complex (i.e., the polyoxometalate and counter cation complex) may be dissolved in the composition or may be dispersed in the composition. In some embodiments, the polyoxometalate and counter cation complex is dissolved or dispersed in a monomer. The polyoxometalate anion is of formula (I):

$$(X_xM_mM'_nO_y)^{q-} \qquad (I)$$

wherein:
X is a heteroatom selected from Cu, Zn, Co, Fe, B, Ga, Rh, Al, Cr, Mn, Ni, Ti, Zr, Si, Ge, P, As, Te, or I;
x is from 0 to 30;
m is from 3 to 248;
n is from 0 to m/2, with the proviso that (0≤x<m+n);
y is from 10 to 720;
q is from 1 to 20;
M and M' are early transition metals independently selected from V, Nb, Ta, Mo or W; and
O is oxygen; and
the counter cation is one or more of formula (II), of formula (III), of formula (IV), a phenylalanine cation, an alanine cation, an arginine cation, a glycine cation, a histidine cation, a proline cation, an aniline cation, a N,N-dimethylaminopyridine cation, a morpholine cation, or a piperazine cation;

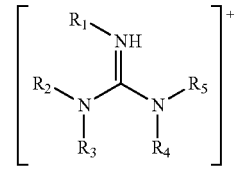

(II)

wherein:
$R_1$ through $R_5$ are independently selected from H, an alkyl group, an alicyclic group, an alkenyl group, and an aryl group, with the proviso that fewer than all of $R_1$ through $R_5$ are H; or $R_1$ through $R_3$ are independently selected from H, an alkyl group, alicyclic group, an alkenyl group, and an aryl group, and $R_4$ and $R_5$ are combined together with the N to which they are both bonded forming a heterocyclic ring;

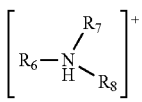
(III)

wherein:
R$_6$ is H, an alkyl group, an alkylamine group, or an alicyclic group; R$_7$ is an alkyl group or an alkylamine group; R$_8$ is H or an alkyl group; and

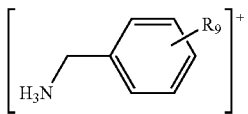
(IV)

wherein R$_9$ is C≡N, an alkoxy group, an alkyl group, an alkenyl group, or an aryl group; and
the polyoxometalate and counter cation complex optionally includes at least one monatomic counter cation. The article is photochromic.

The articles and precursor compositions of the present disclosure, particularly the photochromic films, may also contain one or more conventional additives. Preferred additives include tackifiers, plasticizers, dyes, antioxidants, and UV stabilizers. Such additives can be used if they do not affect the photochromic properties of, for example, the film.

Exemplary Embodiments

Embodiment 1 is a photochromic article comprising:
a polymer; and
a polyoxometalate and counter cation complex comprising a polyoxometalate anion and a counter cation distributed in the polymer;
wherein the polyoxometalate anion is of formula (I):

$$(X_xM_mM'_nO_y)^{q-} \quad (I)$$

wherein:
X is a heteroatom selected from Cu, Zn, Co, Fe, B, Ga, Rh, Al, Cr, Mn, Ni, Ti, Zr, Si, Ge, P, As, Te, or I;
x is from 0 to 30;
m is from 3 to 248;
n is from 0 to m/2, with the proviso that (0≤x<m+n);
y is from 10 to 720;
q is from 1 to 20;
M and M' are early transition metals independently selected from V, Nb, Ta, Mo or W; and
O is oxygen; and
the counter cation is one or more of formula (II), of formula (III), of formula (IV), a phenylalanine cation, an alanine cation, an arginine cation, a glycine cation, a histidine cation, a proline cation, an aniline cation, a N,N-dimethylaminopyridine cation, a morpholine cation, or a piperazine cation;

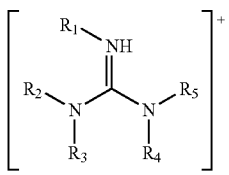
(II)

wherein:
R$_1$ through R$_5$ are independently selected from H, an alkyl group, an alicyclic group, an alkenyl group, and an aryl group, with the proviso that fewer than all of R$_1$ through R$_5$ are H; or R$_1$ through R$_3$ are independently selected from H, an alkyl group, an alicyclic group, an alkenyl group, and an aryl group, and R$_4$ and R$_5$ are combined together with the N to which they are both bonded forming a heterocyclic ring;

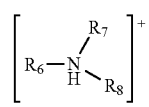
(III)

wherein:
R$_6$ is H, an alkyl group, an alkylamine group, or an alicyclic group; R$_7$ is an alkyl group or an alkylamine group; R$_8$ is H or an alkyl group; and

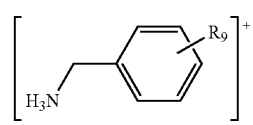
(IV)

wherein R$_9$ is C≡N, an alkoxy group, an alkyl group, an alkenyl group, or an aryl group; and
the polyoxometalate and counter cation complex optionally includes at least one monatomic counter cation;
wherein the polyoxometalate and counter cation complex is distributed in the polymer, and wherein the article is photochromic.

Embodiment 2 is the photochromic article of embodiment 1, wherein the polymer does not participate stoichiometrically in a photochromic redox reaction of the polyoxometalate and counter cation complex.

Embodiment 3 is the photochromic article of embodiment 1 or embodiment 2 wherein the polyoxometalate anion comprises a Keggin structure.

Embodiment 4 is the photochromic article of embodiment 1 or embodiment 2 wherein the polyoxometalate anion comprises a Wells-Dawson structure.

Embodiment 5 is the photochromic article of any of embodiments 1 to 4 wherein M or M' is W or Mo.

Embodiment 6 is the photochromic article of any of embodiments 1 to 5 wherein M or M' is W.

Embodiment 7 is the photochromic article of any of embodiments 1 to 6 wherein X is Si, B, P, or Ge.

Embodiment 8 is the photochromic article of any of embodiments 1 to 7 wherein X is Si.

Embodiment 9 is the photochromic article of any of embodiments 1 to 7 wherein X is B.

Embodiment 10 is the photochromic article of any of embodiments 1 to 7 wherein X is P.

Embodiment 11 is the photochromic article of any of embodiments 1 to 7 wherein X is Ge.

Embodiment 12 is the photochromic article of any of embodiments 1 to 11 wherein m is from 3 to 18.

Embodiment 13 is the photochromic article of any of embodiments 1 to 12 wherein y is from 10 to 62.

Embodiment 14 is the photochromic article of any of embodiments 1 to 13 wherein q is from 2 to 10.

Embodiment 15 is the photochromic article of any of embodiments 1 to 14 wherein the article is in the form of a film.

Embodiment 16 is the photochromic article of any of embodiments 1 to 14 wherein the article is in the form of a plurality of pellets.

Embodiment 17 is the photochromic article of any of embodiments 1 to 16 wherein the polymer comprises polymethylmethacrylate (PMMA), poly(butyl acrylate), poly(tetrahydrofurfural acrylate), or a combination thereof.

Embodiment 18 is the photochromic article of any of embodiments 1 to 17 wherein the polymer comprises PMMA.

Embodiment 19 is the photochromic article of any of embodiments 1 to 18 wherein the polymer comprises a combination of PMMA with 1,6-hexanediol diacrylate.

Embodiment 20 is the photochromic article of any of embodiments 1 to 17 wherein the polymer comprises poly(butyl acrylate).

Embodiment 21 is the photochromic article of any of embodiments 1 to 17 wherein the polymer comprises a poly(tetrahydrofurfural acrylate).

Embodiment 22 is the photochromic article of any of embodiments 1 to 21 wherein the polyoxometalate and counter cation complex is homogeneously distributed in the polymer.

Embodiment 23 is the photochromic article of any of embodiments 1 to 10 or 13 to 22 wherein the polyoxometalate and counter cation complex comprises $(CH_3NHCNH_2NH_2)_3[PW_{12}O_{40}]$, $(CH_3CH_2NHCNH_2NH_2)_3[PW_{12}O_{40}]$, $((CH_3)_2NCNH_2NH_2)_3[PW_{12}O_{40}]$, $(CH_3NHCNH_2NH_2)_5[BW_{12}O_{40}]$, $(CH_3NHCNH_2NH_2)_4[SiW_{12}O_{40}]$, or a combination thereof.

Embodiment 24 is the photochromic article of any of embodiments 1 to 10 or 12 to 22 wherein the polyoxometalate and counter cation complex comprises $(CH_3NHCNH_2NH_2)_3[PW_{12}O_{40}]$, $(CH_3NHCNH_2NH_2)_5[BW_{12}O_{40}]$, $(CH_3NHCNH_2NH_2)_4[SiW_{12}O_{40}]$, or a combination thereof.

Embodiment 25 is the photochromic article of any of embodiments 1 to 7, 10, or 12 to 22 wherein the polyoxometalate and counter cation complex comprises $(CH_3CH_2NHCNH_2NH_2)_3[PW_{12}O_{40}]$.

Embodiment 26 is the photochromic article of any of embodiments 1 to 7, 10, or 12 to 22 wherein the polyoxometalate and counter cation complex comprises $((CH_3)_2NCNH_2NH_2)_3[PW_{12}O_{40}]$.

Embodiment 27 is a method of forming a photochromic film comprising:
forming a composition comprising a polymer or a precursor of the polymer and a polyoxometalate and counter cation complex distributed in the polymer or the precursor of a polymer; and
preparing a film from the composition, the film comprising the polyoxometalate and counter cation complex distributed in the polymer;
wherein the polyoxometalate anion is of formula (I):

wherein:
X is a heteroatom selected from Cu, Zn, Co, Fe, B, Ga, Rh, Al, Cr, Mn, Ni, Ti, Zr, Si, Ge, P, As, Te, or I;
x is from 0 to 30;
m is from 3 to 248;
n is from 0 to m/2, with the proviso that (0≤x<m+n);
y is from 10 to 720;
q is from 1 to 20;

M and M' are early transition metals independently selected from V, Nb, Ta, Mo or W; and
O is oxygen; and
the counter cation is one or more of formula (II), of formula (III), of formula (IV), a phenylalanine cation, an alanine cation, an arginine cation, a glycine cation, a histidine cation, a proline cation, an aniline cation, a N,N-dimethylaminopyridine cation, a morpholine cation, or a piperazine cation;

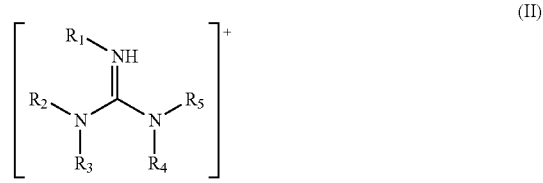

wherein:
$R_1$ through $R_5$ are independently selected from H, an alkyl group, an alicyclic group, an alkenyl group, and an aryl group, with the proviso that fewer than all of $R_1$ through $R_5$ are H; or $R_1$ through $R_3$ are independently selected from H, an alkyl group, an alicyclic group, an alkenyl group, and an aryl group, and $R_4$ and $R_5$ are combined together with the N to which they are both bonded forming a heterocyclic ring;

wherein:
$R_6$ is H, an alkyl group, an alkylamine group, or an alicyclic group; $R_7$ is an alkyl group or an alkylamine group; $R_8$ is H or an alkyl group; and

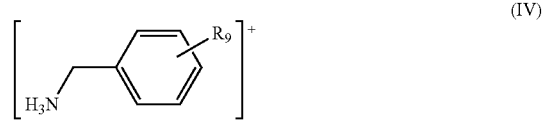

wherein $R_9$ is C≡N, an alkoxy group, an alkyl group, an alkenyl group, or an aryl group; and
the polyoxometalate and counter cation complex optionally includes at least one monatomic counter cation, wherein the film is photochromic.

Embodiment 28 is the method of embodiment 27, wherein the polymer does not participate stoichiometrically in a photochromic redox reaction of the polyoxometalate and counter cation complex.

Embodiment 29 is the method of embodiment 27 or embodiment 28 wherein the composition further comprises a solvent and the polymer or precursor of the polymer is dissolved in the solvent.

Embodiment 30 is the method of any of embodiments 27 to 29 wherein the polyoxometalate and counter cation complex is dissolved in the composition.

Embodiment 31 is the method of any of embodiments 27 to 29 wherein the polyoxometalate and counter cation complex is dispersed in the composition.

Embodiment 32 is the method of embodiment 29 further comprising removing at least some of the solvent from the composition.

Embodiment 33 is the method of any of embodiments 27, 28, or 30 to 32 wherein the preparing comprises extruding the composition.

Embodiment 34 is the method of any of embodiments 27 to 33 wherein the preparing comprises casting the composition and drying the cast composition.

Embodiment 35 is the method of any of embodiments 27 to 34 wherein the preparing further comprises curing the precursor of the polymer.

Embodiment 36 is the method of any of embodiments 27 to 35 wherein the film comprises 5% by weight to 80% by weight of the polyoxometalate and counter cation complex.

Embodiment 37 is the method of any of embodiments 27 to 36 wherein the film comprises 10% by weight to 50% by weight of the polyoxometalate and counter cation complex.

Embodiment 38 is the method of any of embodiments 27 to 37 wherein the film comprises 15% by weight to 30% by weight of the polyoxometalate and counter cation complex.

Embodiment 39 is the method of embodiment 29 wherein the solvent comprises water or an organic solvent.

Embodiment 40 is the method of embodiment 29 or embodiment 39 wherein the solvent comprises acetonitrile.

Embodiment 41 is the method of any of embodiments 27 to 40 wherein preparing the film comprises drying the composition in an atmosphere comprising less than 50% relative humidity.

Embodiment 42 is the method of any of embodiments 27 to 41 wherein the polymer comprises polymethylmethacrylate (PMMA), poly(butyl acrylate), poly(tetrahydrofurfural acrylate), or a combination thereof.

Embodiment 43 is the method of any of embodiments 27 to 42 wherein the polymer comprises PMMA.

Embodiment 44 is the method of any of embodiments 27 to 43 wherein the polymer comprises a combination of PMMA with 1,6-hexanediol diacrylate.

Embodiment 45 is the method of any of embodiments 27 to 42 wherein the polymer comprises poly(butyl acrylate).

Embodiment 46 is the method of any of embodiments 27 to 42 wherein the polymer comprises a poly(tetrahydrofurfural acrylate).

Embodiment 47 is the method of any of embodiments 27 to 46 wherein the polyoxometalate and counter cation complex comprises a Keggin structure.

Embodiment 48 is the method of any of embodiments 27 to 46 wherein the polyoxometalate and counter cation complex comprises a Wells-Dawson structure.

Embodiment 49 is the method of any of embodiments 27 to 48 wherein M or M' is W or Mo.

Embodiment 50 is the method of any of embodiments 27 to 49 wherein M or M' is W.

Embodiment 51 is the method of any of embodiments 27 to 50 wherein X is Si, B, P, or Ge.

Embodiment 52 is the method of any of embodiments 27 to 51 wherein X is Si.

Embodiment 53 is the method of any of embodiments 27 to 51 wherein X is B.

Embodiment 54 is the method of any of embodiments 27 to 51 wherein X is P.

Embodiment 55 is the method of any of embodiments 27 to 51 wherein X is Ge.

Embodiment 56 is the method of any of embodiments 27 to 55 wherein m is from 3 to 18.

Embodiment 57 is the method of any of embodiments 27 to 56 wherein y is from 10 to 62.

Embodiment 58 is the method of any of embodiments 27 to 57 wherein q is from 2 to 10.

Embodiment 59 is the method of any of embodiments 27 to 58 wherein the polyoxometalate and counter cation complex comprises $(CH_3NHCNH_2NH_2)_3[PW_{12}O_{40}]$, $(CH_3CH_2NHCNH_2NH_2)_3[PW_{12}O_{40}]$, $((CH_3)_2NCNH_2NH_2)_3$ $[PW_{12}O_{40}]$, $(CH_3NHCNH_2NH_2)_5$ $[BW_{12}O_{40}]$, $(CH_3NHCNH_2NH_2)_4[SiW_{12}O_{40}]$, or a combination thereof.

Embodiment 60 is the method of any of embodiments 27 to 54 wherein the polyoxometalate and counter cation complex comprises $(CH_3NHCNH_2NH_2)_3[PW_{12}O_{40}]$, $(CH_3NHCNH_2NH_2)_5[BW_{12}O_{40}]$, $(CH_3NHCNH_2NH_2)_4$ $[SiW_{12}O_{40}]$, or a combination thereof.

Embodiment 61 is the method of any of embodiments 27 to 51 wherein the polyoxometalate and counter cation complex comprises $(CH_3CH_2NHCNH_2NH_2)_3[PW_{12}O_{40}]$.

Embodiment 62 is the method of any of embodiments 27 to 51 wherein the polyoxometalate and counter cation complex comprises $((CH_3)_2NCNH_2NH_2)_3[PW_{12}O_{40}]$.

Embodiment 63 is the method of any of embodiments 27 to 62 wherein the polyoxometalate and counter cation complex is homogeneously distributed in the polymer.

Embodiment 64 is a precursor composition for forming a photochromic article, the precursor composition comprising:
  a polymer or a precursor of the polymer; and
  a polyoxometalate and counter cation complex comprising a polyoxometalate anion and a counter cation;
  wherein the polyoxometalate anion is of formula (I):

$$(X_xM_mM'_nO_y)^{q-} \qquad (I)$$

wherein:
  X is a heteroatom selected from Cu, Zn, Co, Fe, B, Ga, Rh, Al, Cr, Mn, Ni, Ti, Zr, Si, Ge, P, As, Te, or I;
  x is from 0 to 30;
  m is from 3 to 248;
  n is from 0 to m/2, with the proviso that (0≤x<m+n);
  y is from 10 to 720;
  q is from 1 to 20;
  M and M' are early transition metals independently selected from V, Nb, Ta, Mo or W; and
  O is oxygen; and
  the counter cation is one or more of formula (II), of formula (III), of formula (IV), a phenylalanine cation, an alanine cation, an arginine cation, a glycine cation, a histidine cation, a proline cation, an aniline cation, a N,N-dimethylaminopyridine cation, a morpholine cation, or a piperazine cation;

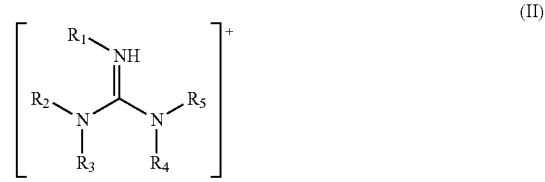

(II)

wherein:
  $R_1$ through $R_5$ are independently selected from H, an alkyl group, an alicyclic group, an alkenyl group, and an aryl group, with the proviso that fewer than all of $R_1$ through $R_5$ are H; or $R_1$ through $R_3$ are independently selected from H, an alkyl group, an alicyclic group, an alkenyl group, and an aryl group, and $R_4$ and $R_5$ are combined together with the N to which they are both bonded forming a heterocyclic ring;

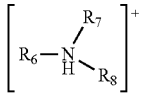 (III)

wherein:
R$_6$ is H, an alkyl group, an alkylamine group, or an alicyclic group; R$_7$ is an alkyl group or an alkylamine group; R$_8$ is H or an alkyl group; and

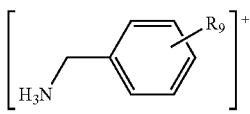 (IV)

wherein R$_9$ is C≡N, an alkoxy group, an alkyl group, an alkenyl group, or an aryl group; and
the polyoxometalate and counter cation complex optionally includes at least one monatomic counter cation.

Embodiment 65 is the precursor composition of embodiment 64, wherein the precursor composition is a fluid and wherein the polymer does not participate stoichiometrically in a photochromic redox reaction of the polyoxometalate and counter cation complex.

Embodiment 66 is the precursor composition of embodiment 64 or embodiment 65, further comprising a solvent and the polymer or precursor of the polymer is dissolved in the solvent.

Embodiment 67 is the precursor composition of any of embodiments 64 to 66 wherein the polyoxometalate anion comprises a Keggin structure.

Embodiment 68 is the precursor composition of any of embodiments 64 to 66 wherein the polyoxometalate anion comprises a Wells-Dawson structure.

Embodiment 69 is the precursor composition of any of embodiments 64 to 68 wherein M or M' is W or Mo.

Embodiment 70 is the precursor composition of any of embodiments 64 to 69 wherein M or M' is W.

Embodiment 71 is the precursor composition of any of embodiments 64 to 70 wherein X is Si, B, P, or Ge.

Embodiment 72 is the precursor composition of any of embodiments 64 to 71 wherein X is Si.

Embodiment 73 is the precursor composition of any of embodiments 64 to 71 wherein X is B.

Embodiment 74 is the precursor composition of any of embodiments 64 to 71 wherein X is P.

Embodiment 75 is the precursor composition of any of embodiments 64 to 71 wherein X is Ge.

Embodiment 76 is the precursor composition of any of embodiments 64 to 75 wherein m is from 3 to 18.

Embodiment 77 is the precursor composition of any of embodiments 64 to 76 wherein y is from 10 to 62.

Embodiment 78 is the precursor composition of any of embodiments 64 to 77 wherein q is from 2 to 10.

Embodiment 79 is the precursor composition of any of embodiments 64 to 78 wherein the precursor composition is in the form of a solution.

Embodiment 80 is the precursor composition of any of embodiments 64 to 78 wherein the precursor composition is in the form of a dispersion.

Embodiment 81 is the precursor composition of any of embodiments 64 to 80 wherein the polymer comprises polymethylmethacrylate (PMMA), poly(butyl acrylate), poly(tetrahydrofurfural acrylate), or a combination thereof.

Embodiment 82 is the precursor composition of any of embodiments 64 to 81 wherein the polymer comprises PMMA.

Embodiment 83 is the precursor composition of any of embodiments 64 to 82 wherein the polymer comprises a combination of PMMA with 1,6-hexanediol diacrylate.

Embodiment 84 is the precursor composition of any of embodiments 64 to 81 wherein the polymer comprises poly(butyl acrylate).

Embodiment 85 is the precursor composition of any of embodiments 64 to 81 wherein the polymer comprises a poly(tetrahydrofurfural acrylate).

Embodiment 86 is the precursor composition of any of embodiments 64 to 85 wherein the polyoxometalate and counter cation complex is homogeneously distributed in the polymer or the precursor of the polymer.

Embodiment 87 is the precursor composition of any of embodiments 64 to 66 or 79 to 86 wherein the polyoxometalate and counter cation complex comprises $(CH_3NHCNH_2NH_2)_3[PW_{12}O_{40}]$, $(CH_3CH_2NHCNH_2NH_2)_3[PW_{12}O_{40}]$, $((CH_3)_2NCNH_2NH_2)_3[PW_{12}O_{40}]$, $(CH_3NHCNH_2NH_2)_5[BW_{12}O_{40}]$, $(CH_3NHCNH_2NH_2)_4[SiW_{12}O_{40}]$, or a combination thereof.

Embodiment 88 is the precursor composition of any of embodiments 64 to 65 or 79 to 86 wherein the polyoxometalate and counter cation complex comprises $(CH_3NHCNH_2NH_2)_3[PW_{12}O_{40}]$, $(CH_3NHCNH_2NH_2)_5[BW_{12}O_{40}]$, $(CH_3NHCNH_2NH_2)_4[SiW_{12}O_{40}]$, or a combination thereof.

Embodiment 89 is the precursor composition of any of embodiments 64 to 66 or 79 to 86 wherein the polyoxometalate and counter cation complex comprises $(CH_3CH_2NHCNH_2NH_2)_3[PW_{12}O_{40}]$.

Embodiment 90 is the precursor composition of any of embodiments 64 to 65 or 76 to 86 wherein the polyoxometalate and counter cation complex comprises $((CH_3)_2NCNH_2NH_2)_3[PW_{12}O_{40}]$.

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Summary of Materials

Unless otherwise noted, all parts, percentages, ratios, etc. in the Examples and the rest of the specification are by weight.

| Material | Vendor | Product code |
|---|---|---|
| 1-methoxy-2-propanol | Aldrich Chemical Company, Inc., Milwaukee, WI | 484407 |
| 1-methylguanidine hydrochloride | Aldrich Chemical Company, Inc., Milwaukee, WI | 22,240-2 |
| acetonitrile | Burdick & Jackson, Muskegon, MI | AH015AA-4 |
| aniline | Sigma-Aldrich, Co., St. Louis, MO | 242284 |
| benzylamine | Alfa Aesar, Ward Hill, MA | A10997 |
| DESMOLUX XP 2740 urethane acrylate | Allnex, Brussels, Belgium | — |
| dihydrochloride piperazine | Sigma Chemical Company, St. Louis, MO | P-5777 |
| diisopropylamine | Aldrich Chemical Company, Inc., Milwaukee, WI | 47,122-4 |
| dimethylamine | Alfa Aesar, Ward Hill, MA | 31458 |
| dimethylformamide | Alfa Aesar, Ward Hill, MA | 43465 |
| Diphenyl (2,4,6-trimethylbenzoyl) phosphine oxide | TCI America, Philadelphia, PA | D3358 |
| guanidine hydrochloride | Alfa Aesar, Ward Hill, MA | A13543 |
| $H_4[PW_{12}O_{40}]$ | Alfa Aesar, Ward Hill, MA | 11827 |
| $H_4[SiW_{12}O_{40}]$ | Alfa Aesar, Ward Hill, MA | 39651 |
| 1,6-hexanediol diacrylate | Alfa Aesar, Ward Hill, MA | 43203 |
| imidazole | Aldrich Chemical Company, Inc., Milwaukee, WI | I-20-2 |
| IRGACURE 184 | Ciba Specialty Chemicals, Tarrytown, NY | — |
| IRGACURE 819 | Ciba Specialty Chemicals, Tarrytown, NY | — |
| Isopropyl alcohol | Aldrich Chemical Company, Inc., Milwaukee, WI | W292907 |
| methylethyl ketone | J. T. Baker, Center Valley, PA | 9319-01 |
| morpholine | Aldrich Chemical Company, Inc., Milwaukee, WI | 25,236-0 |
| N-dimethylaminopyridine | Alfa Aesar, Ward Hill, MA | A13016 |
| PARALOID B-44 MMA copolymer | Dow Chemical Co., Midland, MI | — |
| poly(ethyleneimine) | Polysciences, Inc., Warrington, PA | 6088 |
| poly(methyl methacrylate) | Aldrich Chemical Company, Inc., Milwaukee, WI | 18,223-0 |
| poly(methylmethacrylate-n-butylmethacrylate) | Polysciences, Inc., Warrington, PA | 1922 |
| polytetrafluoroethylene | CS Hyde Company, Lake Villa, IL | 15-30F-12 |
| poly(vinyl acetate) | Polysciences, Inc., Warrington, PA | 6069 |
| tetrahydrofurfuryl acrylate | TCI America, Philadelphia, PA | T2239 |
| 2,2'-azobis-(2-methylbutyronitrile) | Dupont, Wilmington, DE | Vazo-67 |
| iso-octyl thioglycolate | Pfaltz & Bauer, Waterbury, CT | I07870 |
| iso-octyl acrylate | 3M, Cordova, IL | 41-4100-2715-9 |
| iso-bornyl acrylate | San Esters, New York, NY | 5888-33-5 |
| pyridine | Burdick & Jackson, Muskegon, MI | 332-1 |
| quinoline | Eastman-Kodak Company, Rochester, NY | 218 |
| SR334 monofunctional monomer | Sartomer, Exton, PA | — |
| SR506A isobornyl acrylate | Sartomer, Exton, PA | — |
| SR551 methoxy polyethylene glycol (350) monoacrylate | Sartomer, Exton, PA | — |

Comparative Example 1 (CE-1)

Poly(ethyleneimine) (PEI, $M_n$=12,000, branched, 1.9 g) was dissolved in distilled water (10 mL) and to this solution was added polyoxometalate 12-tungstosilicic acid ($H_4[SiW_{12}O_{40}]\cdot6H_2O$) (0.65 g) such that the concentration of $H_4[SiW_{12}O_{40}]\cdot6H_2O$ in the PEI was 25 wt. %. Upon mixing the heteropoly acid (HPA) and PEI a solid precipitated from solution caused by the ionic bonding between the negatively charged HPA and positively charged PEI. Further stirring resulted in a homogeneous solution which could be cast to form a film inside of a glass ring on a polytetrafluoroethylene (PTFE) substrate. The solutions were dried on a 60° C. hot plate overnight. This resulted in a clear solid that was cracked and could not be handled in ambient atmosphere because it was very hygroscopic. Qualitatively, the solids were observed to change colors after 1 minute of irradiation with a 15 W mercury lamp at 365 nm and became dark violet after 5 to 10 minutes of irradiation. Bleaching was observed after >30 minutes in the air at room temperature and the bleaching time could be significantly shortened by placing the PEI/HPA mixture on a 60° C. hotplate. PEI is known to participate in a photochromic redox reaction of the polyoxometalate. The PEI/HPA was observed to have a yellow coloration after 3-4 color/bleaching cycles, an undesirable feature.

Example 1 (EX-1)

A dozen 20 mL screw-top vials were loaded with 12-tungstophosphoric acid ($H_3[PW_{12}O_{40}]\cdot12H_2O$) (1.00 g, 0.32 mmol) and magnetic stir bars and the acid was dissolved in distilled water (10 mL). To each of these vials was added 3 equivalents (0.97 mmol) of one of the following organic bases: aniline (0.09 mL), benzylamine (0.1 mL), dimethylamine (0.12 mL), N-dimethylaminopyridine (DMAP, 118 mg), diisopropylamine (0.14 mL), guanidine hydrochloride (92 mg), imidazole (66 mg), 1-methylguanidine hydrochloride (106 mg), dihydrochloride piperazine (154 mg), pyridine (0.08 mL), quinoline (0.11 mL), and morpholine (0.08 mL). Upon addition of each base a precipitate formed. In some cases, stirring was not adequate to dissolve the organic bases with low water solubility (e.g. aniline, quinoline) so these samples were sonicated in an ultrasonic bath. The resulting salts were collected by vacuum filtration, washed with water (5 mL), and dried in a vacuum oven at 60° C. for 16 hours. Solid samples were irradiated at 365 nm with a 15 W bulb for 30 minutes and a color change, if any, was recorded. A summary of these qualitative results is given in Table 1.

TABLE 1

| Organic base | Structure | Color of salt | Observed Photochromism |
|---|---|---|---|
| aniline | NH₂-phenyl | white | yes |
| benzylamine | H₂N-CH₂-phenyl | white | yes |
| dihydrochloride piperazine | piperazine·2HCl | white | no |
| diisopropylamine | (iPr)₂NH | white | yes |
| dimethylamine | (CH₃)₂NH | white | no |
| N-dimethyl-aminopyridine | 4-(dimethylamino)pyridine | yellow | yes |
| guanidine hydrochloride | H₂N-C(=NH)-NH₂·HCl | white | no |
| imidazole | imidazole | white | no |
| 1-methylguanidine hydrochloride | CH₃NH-C(=NH)-NH₂·HCl | white | yes |
| morpholine | morpholine | white | yes |

TABLE 1-continued

| Organic base | Structure | Color of salt | Observed Photochromism |
|---|---|---|---|
| pyridine | pyridine | white | no |
| quinoline | quinoline | yellow | no |

Example 2 (EX-2)

Polymethylmethacrylate (PMMA, 1.0 g) was dissolved in acetonitrile (5 mL) in two 20 mL screw-top vials with magnetic stirring at a slightly elevated temperature. To each vial was added 0.1 g of the following heteropoly tungstates: 12-tungstosilicic acid ($H_4[SiW_{12}O_{40}]\cdot6H_2O$) and 1-methylguanidinium 12-tungstophosphate ($(C_2H_8N_3)_3[PW_{12}O_{40}]\cdot0.3H_2O$), such that the polyoxometalate and counter cation complex was in 10 wt. % concentration relative to the PMMA. The solutions were stirred to give homogenous mixtures and these solutions were cast into 2.5 cm glass rings on a PTFE film. The films were allowed to dry at room temperature overnight and were further dried in a vacuum oven at 60° C. for several hours. Using this technique to solvent cast films from PMMA gave films with many bubbles and holes caused by evaporation of the solvent. However, some qualitative data could be gathered by irradiation of the films and observing the resulting photochromic properties. The 1-methylguanidinium 12-tungstophosphate/PMMA formulation film was observed to change color after 5-10 minutes of irradiation with a 15 W mercury lamp at 365 nm, but the $H_4[SiW_{12}O_{40}]$/PMMA formulation film was not observed to change color. The guanidinium salt of 12-tungstophosphate in the PMMA film appeared to exhibit a neutral gray color upon irradiation. Bleaching was observed after >30 minutes in the air at room temperature.

Example 3 (EX-3)

In a 20 mL vial 1-methylguanidinium 12-tungstophosphate $((C_2H_8N_3)_3[PW_{12}O_{40}]\cdot0.3H_2O)$ (0.85 g, 0.274 mmol) was dissolved in methyl ethyl ketone (MEK, 5 mL) by stirring for 30 minutes. To this mixture poly(methylmethacrylate-n-butylmethacrylate) (2.0 g) was added such that the polyoxometalate and counter cation complex was 30 wt. % of the total solids and this solution was stirred for 24 hours. The solution was degassed via an ultrasonic bath for 30 minutes and dropped into a glass mold on a PTFE substrate. The sample was then dried for 1 day in an oven at 60° C. Upon drying the clear solution gave a hazy film that measured 0.28 mm in thickness. The sample exhibited a 10% decrease in transmission when irradiated for 2.5 hours via a 15 W mercury lamp emitting 5.43 mJ/cm² of radiation at 365 nm. The sample was then left in darkness and returned to its original state after several hours in the air at room temperature.

Example 4 (EX-4)

A 500 mL bottle was charged with 100 g of tetrahydrofurfuryl acrylate, 186 g of methyl ethyl ketone, 0.1607 g of 2,2'-azobis-(2-methylbutyronitrile), and iso-octyl thioglycolate. Nitrogen was bubbled through the solution for 10 minutes, then the bottle was sealed and heated at 60° C. for 12 hours. The reaction was quenched by exposure to air and the solution was used as described below.

A 500 mL bottle was charged with 75 grams of tetrahydrofurfuryl acrylate, 25 grams of iso-octyl acrylate, 186 grams of methyl ethyl ketone, 0.1607 grams of 2,2'-azobis-(2-methylbutyronitrile), and iso-octyl thioglycolate. Nitrogen was bubbled through the solution for 10 minutes, then the bottle was sealed and heated at 60° C. for 12 hours. The reaction was quenched by exposure to air and the solution was used as described below.

A 500 mL bottle was charged with 75 grams of tetrahydrofurfuryl acrylate, 25 grams of iso-bornyl acrylate, 186 grams of methyl ethyl ketone, 0.1607 grams of 2,2'-azobis-(2-methylbutyronitrile), and iso-octyl thioglycolate. Nitrogen was bubbled through the solution for 10 minutes, then the bottle was sealed and heated at 60° C. for 12 hours. The reaction was quenched by exposure to air and the solution was used as described below.

Solutions containing 35 wt. % poly(THF acrylate); 35 wt. % poly(THF acrylate)-co-poly(iso-octyl acrylate) (75 wt. % poly(THF acrylate) in the copolymer); 35 wt. % poly(THF acrylate)-co-poly(iso-octyl acrylate) (50 wt. % poly(THF acrylate) in the copolymer); 35 wt. % poly(THF acrylate)-co-poly(iso-octyl acrylate) (25 wt. % poly(THF acrylate) in the copolymer); 33 wt. % poly(THF acrylate)-co-poly(iso-octyl acrylate) (90 wt. % poly(THF acrylate) in the copolymer); or 33 wt. % poly(THF acrylate)-co-poly(iso-bornyl acrylate) (90 wt. % poly(THF acrylate) in the copolymer) in MEK were loaded into glass vials and $(C_2H_8N_3)_3$ $[PW_{12}O_{40}]\cdot0.3H_2O$ was added to each such that there was 30 wt. % POM and counter cation complex with respect to the total solids in the solutions. These were magnetically stirred with a PTFE coated stir bar for 24 hours. These solutions were then stirred magnetically with lids removed such that ⅓ of the total volume of each evaporated. The resulting solutions were degassed in an ultrasonic bath for 30 minutes. The solutions were then cast onto a PET substrate with a knife coater set to a 760 μm gap. The resulting samples were dried in an oven set to 70° C. for 48 hours. After drying the samples were stored in a low humidity environment (<10% RH).

Transmittance of POM loaded polymer film samples were measured with a fiber optic UV-vis spectrometer ("JAZ" model) using a light source (HL-2000-FHSA) equipped with a 515 nm low-pass filter all from Ocean Optics Inc., Dunedin, Fla. Each sample was irradiated with a solar simulator (model #96000), consisting of an arc lamp containing a 150 W Xenon lamp (model #6255) and power supply (model#69907) from Oriel Instruments, Stratford, Conn. The full spectrum of the arc lamp was passed through an AM 1.5 global filter (model #81094) then to the sample via a liquid light guide (model #77639) from Newport Instruments, Irvine, Calif., which provides 3.55 mJ/cm² of energy at the sample. Samples were measured in an environmentally controlled enclosure which contained an oxygen enriched atmosphere where the partial pressure of $O_2$ was 60.7% and $N_2$ 39.3%. Samples were irradiated until the transmittance had reduced 70% from its starting value, if a 70% reduction was not possible irradiation was discontinued once rate of change approached zero. The sample was then left in the dark and allowed to return to its original state.

FIG. 1 shows the reversible change in transmittance of a poly(THF acrylate) film containing 30 wt. % $(C_2H_8N_3)_3$ $[PW_{12}O_{40}]$ during irradiation with light from a solar simulator and subsequent removal of the light.

Figure 2:
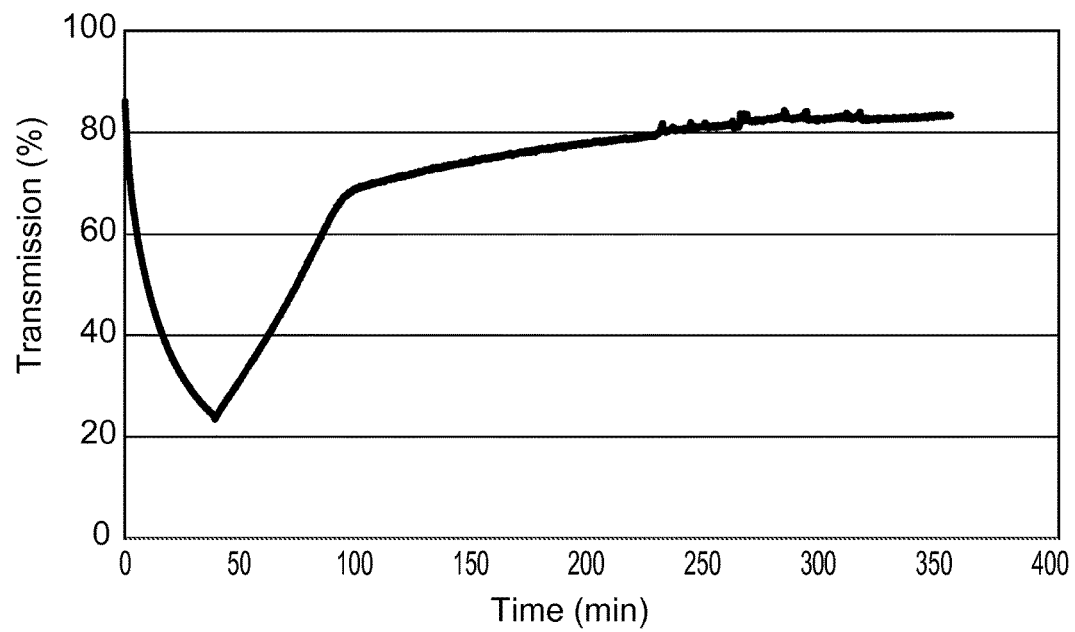
FIG. 2 is a graph of transmittance versus time of a poly(THF acrylate)-co-poly(isooctyl acrylate) (75 wt % poly(THF acrylate) in the copolymer) film containing 30 wt % $(C_2H_8N_3)_3[PW_{12}O_{40}]$ during irradiation with light from a solar simulator and subsequent removal of the light.

FIG. 2 shows the reversible change in transmittance of a poly(THF acrylate)-co-poly(isooctyl acrylate) (75 wt. % poly(THF acrylate) in the copolymers) film containing 30 wt. % $(C_2H_8N_3)_3[PW_{12}O_{40}]$ during irradiation with light from a solar simulator and subsequent removal of the light.

Figure 3:
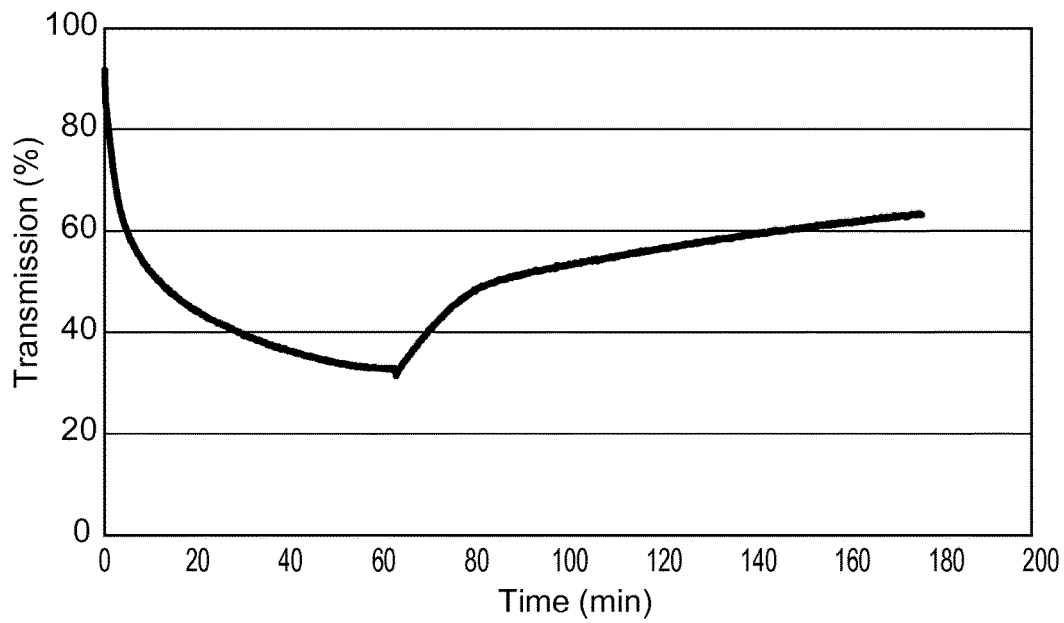
FIG. 3 is a graph of transmittance versus time of a poly(THF acrylate)-co-poly(isooctyl acrylate) (50 wt % poly(THF acrylate) in the copolymer) film containing 30 wt % $(C_2H_8N_3)_3[PW_{12}O_{40}]$ during irradiation with light from a solar simulator and subsequent removal of the light.

FIG. 3 shows the reversible change in transmittance of a poly(THF acrylate)-co-poly(isooctyl acrylate) (50 wt. % poly(THF acrylate) in the copolymers) film containing 30 wt. % $(C_2H_8N_3)_3[PW_{12}O_{40}]$ during irradiation with light from a solar simulator and subsequent removal of the light.

Figure 4:
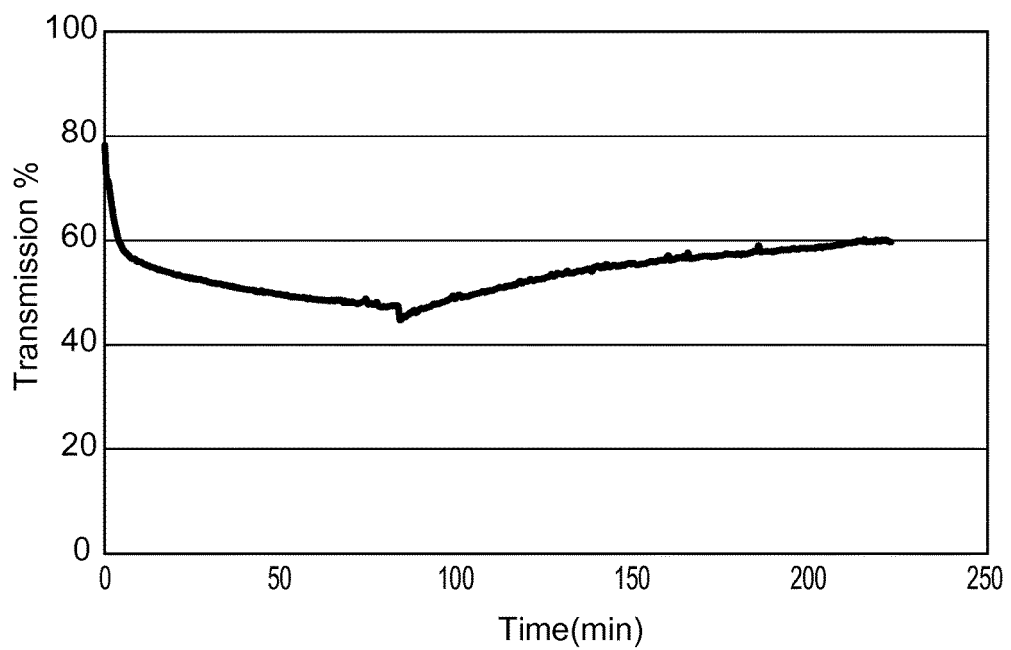
FIG. 4 is a graph of transmittance versus time of a poly(THF acrylate)-co-poly(isooctyl acrylate) (25 wt % poly(THF acrylate) in the copolymer) film containing 30 wt % $(C_2H_8N_3)_3[PW_{12}O_{40}]$ during irradiation with light from a solar simulator and subsequent removal of the light.

FIG. 4 shows the reversible change in transmittance of a poly(THF acrylate)-co-poly(isooctyl acrylate) (25 wt. % poly(THF acrylate) in the copolymers) film containing 30 wt. % $(C_2H_8N_3)_3[PW_{12}O_{40}]$ during irradiation with light from a solar simulator and subsequent removal of the light.

Figure 5:
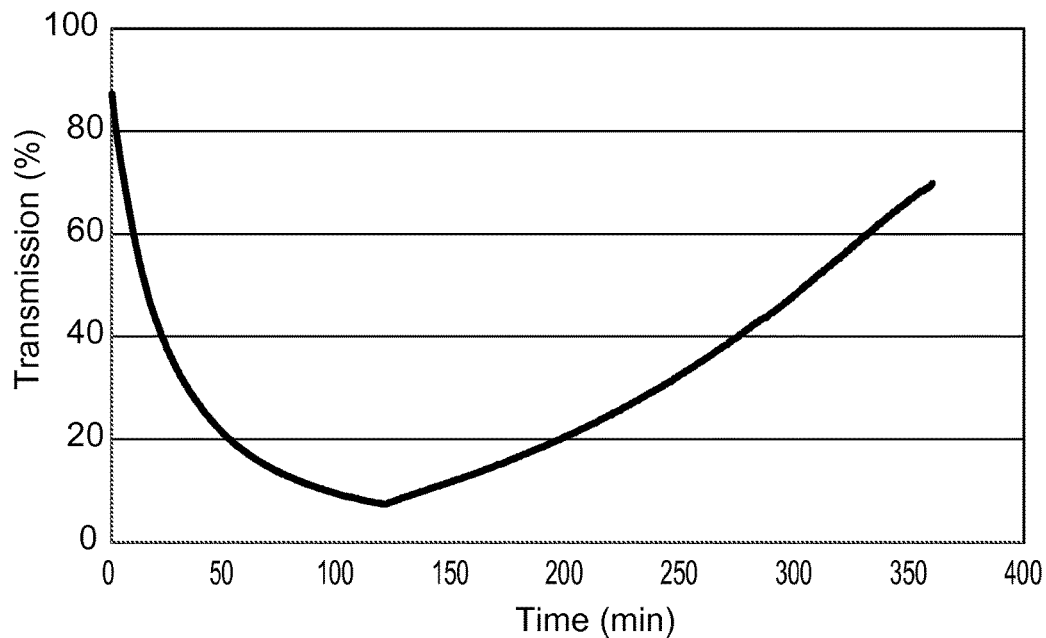
FIG. 5 is a graph of transmittance versus time of a poly(THF acrylate)-co-poly(isooctyl acrylate) (90 wt % poly(THF acrylate) in the copolymer) film containing 30 wt % $(C_2H_8N_3)_3[PW_{12}O_{40}]$ during irradiation with light from a solar simulator and subsequent removal of the light.

FIG. 5 shows the reversible change in transmittance of a poly(THF acrylate)-co-poly(isooctyl acrylate) (90 wt. % poly(THF acrylate) in the copolymers) film containing 30 wt. % $(C_2H_8N_3)_3[PW_{12}O_{40}]$ during irradiation with light from a solar simulator and subsequent removal of the light.

Figure 6:
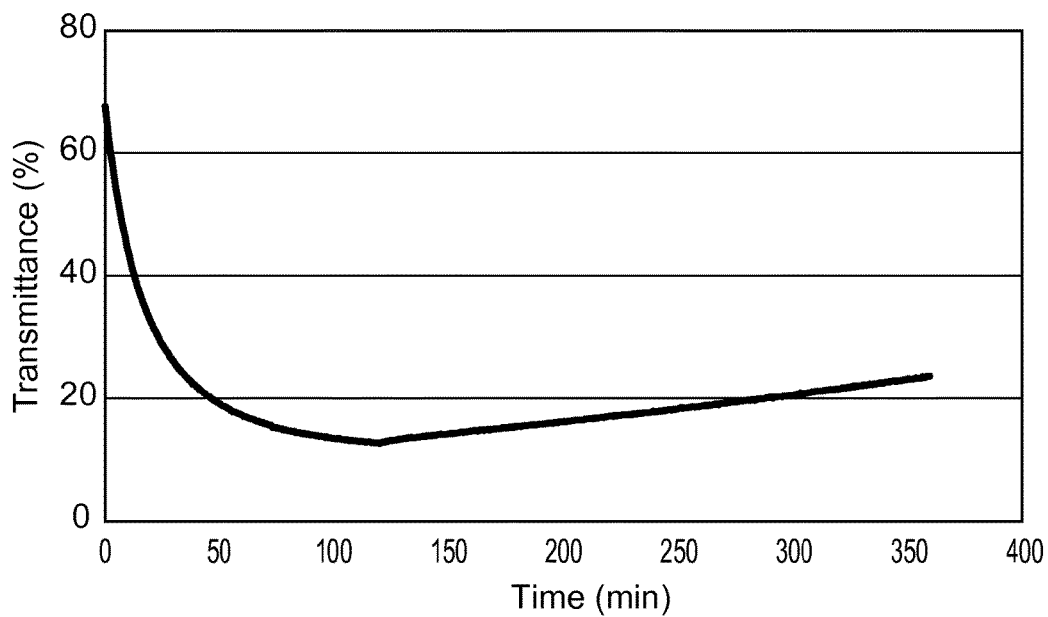
FIG. 6 is a graph of transmittance versus time of a poly(THF acrylate)-co-poly(isobornyl acrylate) (90 wt % poly(THF acrylate) in the copolymer) film containing 30 wt % $(C_2H_8N_3)_3[PW_{12}O_{40}]$ during irradiation with light from a solar simulator and subsequent removal of the light.

FIG. 6 shows the reversible change in transmittance of a poly(THF acrylate)-co-poly(isobornyl acrylate) (90 wt. % poly(THF acrylate) in the copolymers) film containing 30 wt. % $(C_2H_8N_3)_3[PW_{12}O_{40}]$ during irradiation with light from a solar simulator and subsequent removal of the light.

Example 5 (EX-5)

In a 20 mL vial benzylammonium 12-tungstophosphate $((C_7H_9N)_3$ $[PW_{12}O_{40}]\cdot x$ $H_2O)$ (0.54 g, 0.168 mmol) was dissolved in DMF (6.8 mL) by stirring for 30 minutes. To this mixture PMMA (3.0 g) was added such that the POM was 18 wt. % of the total solids and this was stirred for 24 hours. The solution was degassed via ultrasonic bath for 30 minutes and coated onto a glass substrate with a knife coater set to a 750 μm gap. The sample was then dried for 3 days in a low humidity (<10% RH) environment. The resultant sample was irradiated with a 15 W mercury lamp supplying 5.43 mJ/cm² at 365 nm while transmittance was measured with a UV-vis spectrometer. Irradiation was discontinued once a transmittance of 30% was reached. The sample was then left in the dark and allowed to return to its original state.

Figure 7:
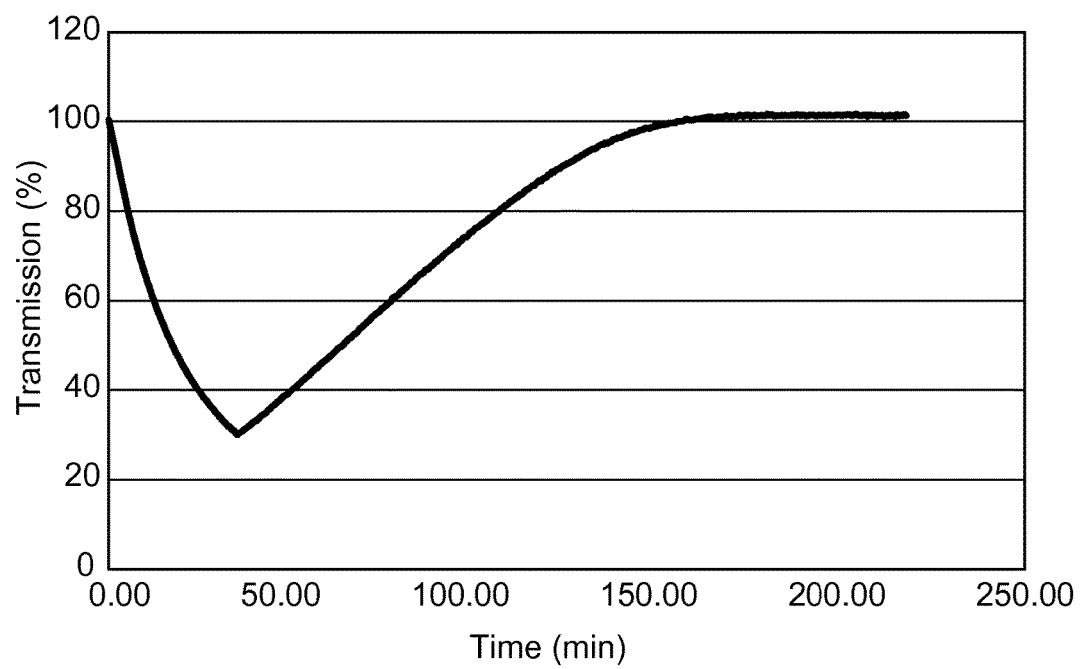
FIG. 7 is a graph of transmittance versus time of a PMMA film containing 18 wt. % $(C_7H_9N)_3$ $[PW_{12}O_{40}]$ during irradiation with 365 nm light and subsequent removal of the light.

FIG. 7 shows the reversible change in transmittance of a PMMA film containing 18 wt. % $(C_7H_9N)_3$ $[PW_{12}O_{40}]$ during irradiation with 365 nm light and subsequent removal of the light.

Example 6 (EX-6)

To each of three vials was added 1.0 g of tri(1-methylguanidinium) 12-tungstophosphate $((C_2H_8N_3)_3[PW_{12}O_{40}])$ and 2.5 mL of methylethyl ketone and a PTFE coated stir bar. These solutions were magnetically stirred for 48 hours. To each of the vials was then added 1.0 mL of 1-methoxy-2-propanol and the solutions were stirred for an additional hour. To one vial was added 1.0 g of PARALOID B-44. To another vial was added 0.5 g of PARALOID B-44, 0.5 mL of 1,6-hexanediol diacrylate, 18 mg of diphenyl(2,4,6-trimethylbenzoyl)phosphine oxide, and 18 mg of IRGACURE 819. To the third vial was added 0.26 g of PARALOID B-44, 0.75 mL of 1,6-hexanediol diacrylate, 18 mg of diphenyl(2,4,6-trimethylbenzoyl)phosphine oxide, and 18 mg of IRGACURE 819 such that the POM was 50 wt % of the total solids concentration. The solutions were stirred to give homogeneous mixtures. The solutions were then cast onto PET substrates with a knife coater set to a 500 μm gap.

Sample 1 (no monomer) was dried in an oven set to 70° C. for 48 hours. Samples 2 and 3 were dried in an oven set to 70° C. for 10 minutes and then cured by 4 passes with a Fusion Systems Model MC-6RQN configured with an H-bulb (available from Fusion UV Systems, Gaithersburg, Md.). The films exhibited a color change after 5-10 minutes of irradiation with a 15 W mercury lamp at 365 nm. The films were dark blue after irradiation. Bleaching was observed after greater than 30 minutes in the air at room temperature.

Example 7 (EX-7)

The tri(1-methylguanidinium) 12-tungstophosphate (13 g) was dissolved in SR551 (39 g) such that it was 25 wt % of the resin mixture. To this was added 6.0 g of SR344 and 58 mg of IRGACURE 819. The resin was applied to two different substrates using two different techniques. First, the resin was applied to a 3SAB primed 2 mil (50.8 µm) PET film by dropcasting the resin mixture and then laminating a release liner on top. This was cured with a 365 nm Hg lamp for 15 minutes or until fully cured. Next, the resin was applied to a 2 inch×3 inch (5.08 centimeter×7.62 centimeter) glass microscope slide with an RDS #8 Mayer rod. The sample was cured by 4 passes with a Fusion Systems Model MC-6RQN configured with an H-bulb (available from Fusion UV Systems, Gaithersburg, Md.). The resulting coating on the PET liner was 235 µm thick. When irradiated with a UV light source (15 W mercury lamp at 365 nm) for >1 hour the transmission at 650 nm decreased by 75%. The sample slowly faded when left in the dark. The film coating on glass was 25 µm thick and gave a 17% decrease in transmission averaged over 500-700 nm when irradiated with a UV light source (15 W mercury lamp at 365 nm) for more than 1 hour. The sample slowly faded when left in the dark.

Example 8 (EX-8)

In a 60 mL polypropylene cup was added DESMOLUX 2740 (5.0 g), SR506A (2.0 g), and 1,6-hexanediol diacrylate (0.50 g). This was mixed using a DAC 400 FVZ SPEED-MIXER dual asymmetric centrifuge mixer, (Flacktek, Inc., Landrum, S.C.) at 2000 RPM for 20 seconds. Then IRGACURE 184 was added and this was mixed at 2000 RPM for 20 seconds. To this resin was added a solution tri(1-methylguanidinium) 12-tungstophosphate in MEK (3.0 g, 50 wt % solution) and this solution was mixed at 2000 RPM for 20 seconds. This formulation was then coated onto a PET liner with a Multiple Clearance Square Applicator (available from Paul N. Gardner Company, Pompano Beach, Fla. 33060) with a 25 mil (0.635 mm) gap. This was dried in a 70° C. oven for 10 minutes and then the sample was cured by 4 passes with a Fusion Systems Model MC-6RQN configured with an H-bulb (available from Fusion UV Systems, Gaithersburg, Md.). When irradiated with a UV light source (15 W mercury lamp at 365 nm) for more than 1 hour the transmission averaged over 450-750 nm decreased by 30%. The sample slowly faded when left in the dark.

Example 9 (EX-9)

The tri(benzyl ammonium) 12-tungstophosphate $((C_7H_9N)_3[PW_{12}O_{40}])$ (0.90 g, 0.28 mmol) and MEK (6.0 mL) were loaded into a vial along with a PTFE coated magnetic stir bar. The mixture was stirred for 30 minutes. To the mixture PMMA (120,000 g/mol, 3.0 g) was added and the solution was magnetically stirred for 12 hours. A 2 L flask was loaded with 1 L of hexanes, equipped with a PTFE stir bar, and stirred vigorously. The POM/PMMA/MEK solution was then added to the flask containing hexanes drop-wise. This solution was then stirred for 12 hours. The resultant precipitate was collected by vacuum filtration. A 0.30 g quantity of the dried precipitate was hot pressed using a Carver model 3725 hot press at 330° F. (165.6° C.), using aluminum shims 75 µm thick and a force of 6 tons. The sample was left in the hot press for 10 minutes and then removed. This sample was then irradiated for 50 minutes with a 15 W mercury lamp at an intensity of 5.43 mJ/cm² at 365 nm. The transmittance at 715 nm decreased by 71%. Irradiation was discontinued and the sample was left in the dark for 300 minutes, during which time the transmittance increased by 22%.

Example 10 (EX-10)

The tri(1-methylguanidinium) 12-tungstophosphate $((C_2H_8N_3)_3[PW_{12}O_{40}])$ (0.9 g, 0.29 mmol) and MEK (6.0 mL) was loaded into a vial along with a PTFE coated magnetic stir bar. The mixture was stirred for 30 minutes. To the mixture PMMA (120,000 g/mol, 3.0 g) was added and the solution was magnetically stirred for 12 hours. A 2 L flask was loaded with 1 L of hexanes, equipped with a PTFE stir bar, and stirred vigorously. The POM/PMMA/MEK solution was then added to the flask containing hexanes drop-wise. This solution was then stirred for 12 hours. The resultant precipitate was collected by vacuum filtration. A 0.30 g quantity of the dried precipitate was hot pressed using a Carver model 3725 hot press at 330° F. (165.6° C.), using aluminum shims 150 µm thick and a force of 6 tons. The sample was left in the hotpress for 10 minutes and then removed. This sample was then irradiated for 90 minutes with a 15 W mercury at an intensity 5.43 mJ/cm² at 365 nm. The transmittance at 715 nm decreased by 64%. Irradiation was discontinued and the sample was left in the dark for 330 minutes during which time the transmittance increased by 7%.

While the specification has described in detail certain exemplary embodiments, it will be appreciated that those skilled in the art, upon attaining an understanding of the foregoing, may readily conceive of alterations to, variations of, and equivalents to these embodiments. Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

What is claimed is:
1. A photochromic article comprising:
a polymer; and
a polyoxometalate and counter cation complex comprising a polyoxometalate anion and a counter cation distributed in the polymer;
wherein the polyoxometalate anion is of formula (I):

$$(X_xM_mM'_nO_y)^{q-} \qquad (I)$$

wherein:
X is a heteroatom selected from the group consisting of Cu, Zn, Co, Fe, B, Ga, Rh, Al, Cr, Mn, Ni, Ti, Zr, Si, Ge, P, As, Te, and I;

x is from 0 to 30;
m is from 3 to 248;
n is from 0 to m/2, with the proviso that 0≤x<m+n;
y is from 10 to 720;
q is from 1 to 20;
M and M' are early transition metals independently selected from the group consisting of V, Nb, Ta, Mo and W; and
O is oxygen; and
the counter cation is selected from the group consisting of formula (II), of formula (III), of formula (IV), a phenylalanine cation, an alanine cation, an arginine cation, a glycine cation, a histidine cation, a proline cation, an aniline cation, a N,N-dimethylaminopyridine cation, a morpholine cation, a piperazine cation, and combinations thereof;

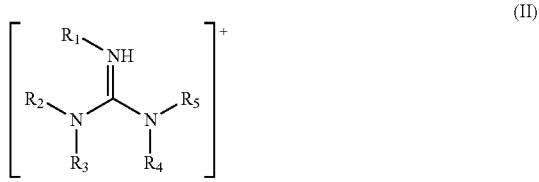

(II)

wherein:
R$_1$ through R$_5$ are independently selected from the group consisting of H, an alkyl group, an alicyclic group, an alkenyl group, and an aryl group, with the proviso that fewer than all of R$_1$ through R$_5$ are H; or R$_1$ through R$_3$ are independently selected from the group consisting of H, an alkyl group, an alicyclic group, an alkenyl group, and an aryl group, and R$_4$ and R$_5$ are combined together with the N to which they are both bonded forming a heterocyclic ring;

(III)

wherein:
R$_6$ is H, an alkyl group, an alkylamine group, or an alicyclic group; R$_7$ is an alkyl group or an alkylamine group; R$_8$ is H or an alkyl group; and

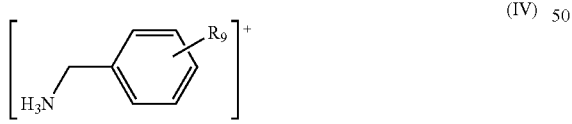

(IV)

wherein R$_9$ is C≡N, an alkoxy group, an alkyl group, an alkenyl group, or an aryl group; and
the polyoxometalate and counter cation complex optionally includes at least one monatomic counter cation;
wherein the polyoxometalate and counter cation complex is distributed in the polymer, wherein the counter cation is not covalently bonded to the polymer, and wherein the article is photochromic.

2. The photochromic article of claim 1, wherein the polymer does not participate stoichiometrically in a photochromic redox reaction of the polyoxometalate and counter cation complex.

3. The photochromic article of claim 1, wherein the polyoxometalate anion comprises a Keggin structure.

4. The photochromic article of claim 1, wherein M or M' is W or Mo.

5. The photochromic article of claim 1, wherein the polymer comprises polymethylmethacrylate (PMMA), poly(butyl acrylate), poly(tetrahydrofurfural acrylate), poly(isooctyl acrylate), poly(isobornyl acrylate), poly(hydroxyethyl acrylate), polymethylmethacrylate copolymer, or a combination thereof.

6. The photochromic article of claim 1, wherein the polyoxometalate and counter cation complex is homogeneously distributed in the polymer.

7. A method of forming a photochromic film comprising:
forming a composition comprising a polymer or a precursor of the polymer and a polyoxometalate and counter cation complex comprising a polyoxometalate anion and a counter cation distributed in the polymer; and
preparing a film from the composition, the film comprising the polyoxometalate and counter cation complex distributed in the polymer wherein the counter cation is not covalently bonded to the polymer;
wherein the polyoxometalate anion is of formula (I):

$$(x_xM_mM'_nO_y)^{q-}$$ (I)

wherein:
X is a heteroatom selected from the group consisting of Cu, Zn, Co, Fe, B, Ga, Rh, Al, Cr, Mn, Ni, Ti, Zr, Si, Ge, P, As, Te, and I;
x is from 0 to 30;
m is from 3 to 248;
n is from 0 to m/2, with the proviso that 0≤x<m+n;
y is from 10 to 720;
q is from 1 to 20;
M and M' are early transition metals independently selected from the group consisting of V, Nb, Ta, Mo and W; and
O is oxygen; and
the counter cation is selected from the group consisting of formula (II), of formula (III), of formula (IV), a phenylalanine cation, an alanine cation, an arginine cation, a glycine cation, a histidine cation, a proline cation, an aniline cation, a N,N-dimethylaminopyridine cation, a morpholine cation, a piperazine cation, and combinations thereof;

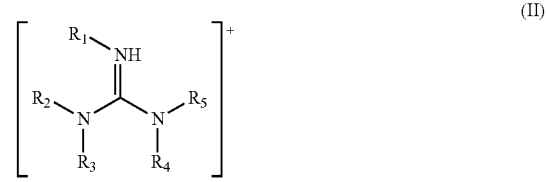

(II)

wherein:
R$_1$ through R$_5$ are independently selected from the group consisting of H, an alkyl group, an alicyclic group, an alkenyl group, and an aryl group, with the proviso that fewer than all of R$_1$ through R$_5$ are H; or R$_1$ through R$_3$ are independently selected from the group consisting of H, an alkyl group, an alicyclic group, an alkenyl group, and an aryl group, and R$_4$ and R$_5$ are combined together with the N to which they are both bonded forming a heterocyclic ring;

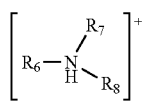
(III)

wherein:
R₆ is H, an alkyl group, an alkylamine group, or an alicyclic group; R₇ is an alkyl group or an alkylamine group; R₈ is H or an alkyl group; and

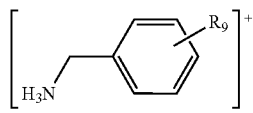
(IV)

wherein R₉ is C≡N, an alkoxy group, an alkyl group, an alkenyl group, or an aryl group; and
the polyoxometalate and counter cation complex optionally includes at least one monatomic counter cation;
wherein the film is photochromic.

8. The method of claim 7, wherein the polyoxometalate and counter cation complex is dissolved in the composition.

9. The method of claim 7, wherein the polyoxometalate and counter cation complex is dispersed in the composition.

10. The method of claim 7, wherein the preparing further comprises curing the precursor of the polymer.

11. The method of claim 7, wherein the film comprises 5% by weight to 80% by weight of the polyoxometalate and counter cation complex.

12. The method of claim 7, wherein preparing the film comprises drying the composition in an atmosphere comprising less than 50% relative humidity.

13. A precursor composition for forming a photochromic article, the precursor composition comprising:
a polymer or a precursor of the polymer; and
a polyoxometalate and counter cation complex comprising a polyoxometalate anion and a counter cation dissolved in the composition or dispersed in the composition, wherein the counter cation is not covalently bonded to the polymer;
wherein the polyoxometalate anion is of formula (I):

$$(X_xM_mM'_nO_y)^{q-}$$ (I)

wherein:
X is a heteroatom selected from the group consisting of Cu, Zn, Co, Fe, B, Ga, Rh, Al, Cr, Mn, Ni, Ti, Zr, Si, Ge, P, As, Te, and I;
x is from 0 to 30;
m is from 3 to 248;
n is from 0 to m/2, with the proviso that 0≤x<m+n;
y is from 10 to 720;
q is from 1 to 20;
M and M' are early transition metals independently selected from the group consisting of V, Nb, Ta, Mo and W; and
O is oxygen; and
the counter cation is selected from the group consisting of formula (II), of formula (III), of formula (IV), a phenylalanine cation, an alanine cation, an arginine cation, a glycine cation, a histidine cation, a proline cation, an aniline cation, a N,N-dimethylaminopyridine cation, a morpholine cation, a piperazine cation, and combinations thereof;

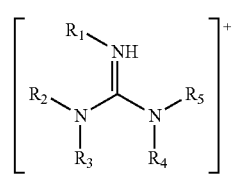
(II)

wherein:
R₁ through R₅ are independently selected from the group consisting of H, an alkyl group, an alicyclic group, an alkenyl group, and an aryl group, with the proviso that fewer than all of R₁ through R₅ are H; or R₁ through R₃ are independently selected from the group consisting of H, an alkyl group, an alicyclic group, an alkenyl group, and an aryl group, and R₄ and R₅ are combined together with the N to which they are both bonded forming a heterocyclic ring;

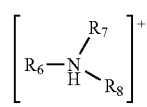
(III)

wherein:
R₆ is H, an alkyl group, an alkylamine group, or an alicyclic group; R₇ is an alkyl group or an alkylamine group; R₈ is H or an alkyl group; and

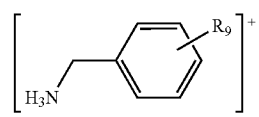
(IV)

wherein R₉ is C≡N, an alkoxy group, an alkyl group, an alkenyl group, or an aryl group and
the polyoxometalate and counter cation complex optionally includes at least one monatomic counter cation.

14. The precursor composition of claim 13, further comprising a solvent and the polymer or precursor of the polymer is dissolved in the solvent.

15. The precursor composition of claim 13, wherein the precursor composition is a fluid and wherein the polymer does not participate stoichiometrically in a photochromic redox reaction of the polyoxometalate and counter cation complex.

* * * * *

UNITED STATES PATENT AND TRADEMARK OFFICE
CERTIFICATE OF CORRECTION

PATENT NO. : 9,976,076 B2
APPLICATION NO. : 15/320516
DATED : May 22, 2018
INVENTOR(S) : Miller et al.

Page 1 of 1

It is certified that error appears in the above-identified patent and that said Letters Patent is hereby corrected as shown below:

On the Title Page

<u>Column 1,</u>
(*) Notice, Line 3, after "0 days." delete "days.".

In the Specification

<u>Column 25,</u>
Line 53, delete "(model#69907)" and insert -- (model #69907) --, therefor.

In the Claims

<u>Column 28,</u>
Line 63, in Claim 1, delete "$(x_xM_mM'_nO_y)^{q-}$" and insert -- $(X_xM_mM'_nO_y)^{q-}$ --, therefor.

<u>Column 30,</u>
Line 26, in Claim 7, delete "$(x_xM_mM'_nO_y)^{q-}$" and insert -- $(X_xM_mM'_nO_y)^{q-}$ --, therefor.

Signed and Sealed this
Twenty-fourth Day of July, 2018

Andrei Iancu
*Director of the United States Patent and Trademark Office*